United States Patent Office 3,832,337
Patented Aug. 27, 1974

3,832,337
PEPTIDE ENZYME INHIBITORS
Miguel A. Ondetti, North Brunswick, and Josip Pluscec, East Brunswick, N.J., assignors to E. R. Squibb & Sons, Inc., Princeton, N.J.
No Drawing. Continuation-in-part of applications Ser. No. 58,686, July 28, 1970 and Ser. No. 61,794, Aug. 6, 1970, which is a continuation-in-part of application Ser. No. 20,860, Mar. 18, 1970, all now abandoned. This application June 1, 1972, Ser. No. 258,714
Int. Cl. A61k 27/00; C07c 103/52
U.S. Cl. 260—112.5                    13 Claims

ABSTRACT OF THE DISCLOSURE

The enzymatic conversion of angiostensin I into angiotensin II is inhibited by a peptide or an acylated peptide having one of the following amino acid sequences:

1. An acylated tripeptide of the formula

Cac-Phe-Ala-Pro wherein Cac is chloroacetic acid;

2. A tetrapeptide of the formula pGlu-Trp-Ala-Pro or pGlu-Lys-Trp-Ala;

3. An acylated tetrapeptide of the formula

Dac-Fly-Phe-Ala-Pro or A-Lys-Phe-Ala-Pro wherein Dac is diazoacetic acid, and A is chloroacetic acid, cyclobutylcarboxylic acid, cyclopentylcarboxylic acid or cyclohexylcarboxylic acid;

4. A pentapeptide of the formula pGlu-B-Phe-Ala-Pro wherein B is Lys, Nle, Glu or Gln;

pGlu-C-Trp-Ala-Pro wherein C is Nle, His, Orn or Arg;
    N'pGlu-Lys-Trp-Ala-Pro; pGlu-Lys-E-Ala-Pro
wherein E is His, Ile, Pro, Ser or 3-amino-4-phenyl-butyric acid;

pGlu-Lys-Phe-F-Pro wherein F is Gly, Pro or Lac;

pGlu-Lys-Phe-Ala-G wherein G is Ala, Asp or Glu;

pGlu-Lys-Trp-H wherein H is Ile-Pro, Thr-Pro, Ala-Gly or Ala-Sar;

pGlu-Trp-Pro-J-Pro wherein J is His, Lys or Gly;

5. An acylated pentapeptide of the formula

Dac-Gly-Gly-Phe-Ala-Pro wherein Dac is diazoacetic acid;

6. A hexapeptide of the formula pGlu-Lys-Phe-Ala-Pro-Pro; pGlu-K-Trp-Pro-Arg-Pro wherein K is Asn, Nle or Ser;

pGlu-Nle-Trp-Pro-L-Pro wherein L is His or Gly;

pGlu-Asn-Trp-Pro-M-Pro wherein M is Lys or Gly;

7. An octapeptide of the formula pGlu-Ile-Pro-Pro-Lys-Phe-Ala-Pro;

8. An acylated octapeptide of the formula

N-O-Pro-Arg-Pro-Gln-Ile-Pro-Pro wherein N is cyclobutylcarboxylic acid, cyclopentylcarboxylic acid or cyclohexylcarboxylic acid and O is Trp, Tyr, $$\overset{Bzl}{\underset{Tyr,}{|}}$$

Phe, Gly, Leu, or D-Trp;

N-Trp-Pro-Gly-Pro-Lys-βHphe-Ala-Pro wherein N is as defined above and βHphe is 3-amino-4-phenylbutyric acid;

9. A nonapeptide of the formula pGlu-Trp-Pro-P-Pro-Q-Ile-Pro-Pro wherein P is Arg, His, Lys or Gly and Q is Gln or Asn;

pGlu-Trp-Pro-R-Pro-S-T-Ala-Pro wherein R is Arg or Orn, S is Nle or Gln and T is Ile or Phe;

pGlu-Trp-Pro-Orn-Pro-S-T-Pro-Pro wherein S and T are as defined above;

pGlu-O-Pro-Arg-Pro-Gln-Ile-Pro-Pro wherein O is as defined above;

pGlu-Trp-Pro-Arg-Pro-Nle-T-Pro-Pro wherein T is as defined above;

pGlu-Trp-Pro-Arg-Pro-Glu-Phe-Pro-Pro;
    pGlu-Trp-Pro-Arg-Pro-Lys-Phe-Ala-Pro;
    pGlu-Trp-Pro-D-Arg-Pro-Gln-Ile-Pro-Pro;
    pGlu-Trp-Pro-Arg-Pro-Gln-Phe-Pro-Pro;
    pGlu-Trp-Pro-Gly-Pro-Glu-Ile-Pro-Pro;
    pGlu-Lys-Phe-Ala-Pro-Gln-Ile-Pro-Pro;

10. A decapeptide of the formula pGlu-K-Trp-Pro-P-Pro-Q-Ile-Pro-Pro wherein K, P and Q are as defined above;

pGlu-U-Trp-Pro-Arg-Pro-Gln-Ile-Pro-Pro wherein U is Lys or Glu;

11. An undecapeptide of the formula pGlu-Trp-Pro-Arg-Pro-V-Pro-W-Ile-Pro-Pro wherein V is Thr or Gly and W is Gln or Glu;

12. A tridecapeptide of the formula pGlu-Gly-Gly-Trp-Pro-Arg-Pro-Gly-Pro-W-Ile-Pro-Pro wherein W is as defined above.

RELATED APPLICATIONS

This application is a continuation-in-part of copending applications Ser. No. 58,686 filed 28 July 1970 and Ser. No. 61,794 filed 6 Aug. 1970 both now abandoned. The latter application in turn is a continuation-in-part of co-pending application Ser. No. 20,860 filed 18 Mar. 1970, now abandoned.

BACKGROUND OF THE INVENTION

The action of the enzyme renin on renin substrate, a pseudoglobulin in blood plasma, produces a polypeptide angiotensin I, also known as hypertensin I. The latter is converted by an enzyme to angiotensin II, also known as hypertensin II or angiotonin. Angiotensin II is an active pressor substance which is present in the plasma of individuals with essential hypertension in quantities sufficient to maintain elevated blood pressure. Inhibition of the enzyme responsible for the conversion of angiotensin I to angiotensin II serves to remove a cause of essential hypertension.

OBJECTS OF THE INVENTION

It is, accordingly, an object of the present invention to provide compounds which inhibit the conversion of angiotensin I into angiotensin II. Another object is to provide compounds which are effective in relieving essential hypertension. A further object is to provide a method for alleviating essential hypertension. These and other objects of the present invention will be apparent from the following description.

DETAILED DESCRIPTION

Unless otherwise indicated in the following specification and claims, all amino acids are of the L-configuration.

In describing the peptides of the present invention, the following abbreviations will be used throughout the specification and claims:

Ala—alanine
Arg—arginine
D-Arg—D-arginine
Asn—asparagine
Asp—aspartic acid
βHphe—3-amino-4-phenylbutyric
Cac—chloroacetic acid
Cbc—cyclobutylcarboxylic acid
Chc—cyclohexylcarboxylic acid
Cpc—cyclopropylcarboxylic acid
Dac—diazoacetic acid
Gln—glutamine
Glu—glutamic acid
Gly—glycine
His—histidine
Ile—isoleucine
Lac—lactic acid
Leu—leucine
Lys—lysine
Nle—norleucine
Orn—ornithine
Phe—phenylalanine
Pro—proline
Pyr or pGlu—pyroglutamic acid
Sar—sarcosine
Ser—serine
Thr—threonine
Trp—tryptophane
D-Trp—D-tryptophane
Tyr—tyrosine.

The following peptides of the present invention have been found to be effective in inhibiting the enzymatic conversion of angiotensin I into angiotensin II:

1. Cac-Phe-Ala-Pro
2. Pyr-Trp-Ala-Pro
3. Pyr-Lys-Trp-Ala
4. Pyr-Lys-Phe-Ala-Pro
5. Pyr-Nle-Phe-Ala-Pro
6. Pyr-Glu-Phe-Ala-Pro
7. Pyr-Gln-Phe-Ala-Pro
8. Pyr-Nle-Trp-Ala-Pro
9. Pyr-His-Trp-Ala-Pro
10. Pyr-Orn-Trp-Ala-Pro
11. Pyr-Arg-Trp-Ala-Pro
12. N·Pyr-Lys-Trp-Ala-Pro
13. Pyr-Lys-His-Ala-Pro
14. Pyr-Lys-Ile-Ala-Pro
15. Pyr-Lys-Pro-Ala-Pro
16. Pyr-Lys-Ser-Ala-Pro
17. Pyr-Lys-βHphe-Ala-Pro
18. Pyr-Lys-Phe-Gly-Pro
19. Pyr-Lys-Phe-Pro-Pro
20. Pyr-Lys-Phe-Lac-Pro
21. Pyr-Lys-Phe-Ala-Ala
22. Pyr-Lys-Phe-Ala-Asp
23. Pyr-Lys-Phe-Ala-Glu
24. Pyr-Lys-Trp-Ile-Pro
25. Pyr-Lys-Trp-Thr-Pro
26. Pyr-Lys-Trp-Ala-Gly
27. Pyr-Lys-Trp-Ala-Sar
28. Pyr-Trp-Pro-Arg-Pro
29. Pyr-Trp-Pro-His-Pro
30. Pyr-Trp-Pro-Lys-Pro
31. Pyr-Trp-Pro-Gly-Pro
32. Dac-Gly-Gly-Phe-Ala-Pro
33. Pyr-Lys-Phe-Ala-Pro-Pro
34. Pyr-Asn-Trp-Pro-Arg-Pro
35. Pyr-Nle-Trp-Pro-Arg-Pro
36. Pyr-Ser-Trp-Pro-Arg-Pro
37. Pyr-Nle-Trp-Pro-His-Pro
38. Pyr-Nle-Trp-Pro-Gly-Pro
39. Pyr-Asn-Trp-Pro-Lys-Pro
40. Pyr-Asn-Trp-Pro-Gly-Pro
41. Pyr-Ile-Pro-Pre-Lys-Phe-Ala-Pro
42. Cbc-Trp-Pro-Arg-Pro-Gln-Ile-Pro-Pro
43. Cbc-Tyr-Pro-Arg-Pro-Gln-Ile-Pro-Pro
44. Cbc-Tyr(Bzl)-Pro-Arg-Pro-Gln-Ile-Pro-Pro
45. Cbc-Phe-Pro-Arg-Pro-Gln-Ile-Pro-Pro
46. Cbc-Gly-Pro-Arg-Pro-Gln-Ile-Pro-Pro
47. Cbc-Leu-Pro-Arg-Pro-Gln-Ile-Pro-Pro
48. Cbc-D-Trp-Pro-Arg-Pro-Gln-Ile-Pro-Pro
49. Cpc-Trp-Pro-Arg-Pro-Gln-Ile-Pro-Pro
50. Cpc-Tyr-Pro-Arg-Pro-Gln-Ile-Pro-Pro
51. Cpc-Tyr(Bzl)-Pro-Arg-Pro-Gln-Ile-Pro-Pro
52. Cpc-Phe-Pro-Arg-Pro-Gln-Ile-Pro-Pro
53. Cpc-Gly-Pro-Arg-Pro-Gln-Ile-Pro-Pro
54. Cpc-Leu-Pro-Arg-Pro-Gln-Ile-Pro-Pro
55. Cpc-D-Trp-Pro-Arg-Pro-Gln-Ile-Pro-Pro
56. Chc-Trp-Pro-Arg-Pro-Gln-Ile-Pro-Pro
57. Chc-Tyr-Pro-Arg-Pro-Gln-Ile-Pro-Pro
58. Chc-Tyr(Bzl)-Pro-Arg-Pro-Gln-Ile-Pro-Pro
59. Chc-Phe-Pro-Arg-Pro-Gln-Ile-Pro-Pro

| | | | | |
|---|---|---|---|---|
| 60. | Chc-Gly-Pro-Arg-Pro-Gln-Ile-Pro-Pro | | 106. | Pyr-Asn-Trp-Pro-His-Pro-Asn-Ile-Pro-Pro |
| 61. | Chc-Leu-Pro-Arg-Pro-Gln-Ile-Pro-Pro | | 107. | Pyr-Ser-Trp-Pro-His-Pro-Asn-Ile-Pro-Pro |
| 62. | Chc-D-Trp-Pro-Arg-Pro-Gln-Ile-Pro-Pro | | 108. | Pyr-Nle-Trp-Pro-His-Pro-Asn-Ile-Pro-Pro |
| 63. | Cpc-Trp-Pro-Gly-Pro-Lys-βHphe-Ala-Pro | | 109. | Pyr-Asn-Trp-Pro-Lys-Pro-Asn-Ile-Pro-Pro |
| 64. | Cbc-Trp-Pro-Gly-Pro-Lys-βHphe-Ala-Pro | | 110. | Pyr-Ser-Trp-Pro-Lys-Pro-Asn-Ile-Pro-Pro |
| 65. | Chc-Trp-Pro-Gly-Pro-Lys-βHphe-Ala-Pro | | 111. | Pyr-Nle-Trp-Pro-Lys-Pro-Asn-Ile-Pro-Pro |
| 66. | Cbc-Trp-Pro-Gly-Pro-Nle-βHphe-Ala-Pro | | 112. | Pyr-Asn-Trp-Pro-Gly-Pro-Asn-Ile-Pro-Pro |
| 67. | Cpc-Trp-Pro-Gly-Pro-Nle-βHphe-Ala-Pro | | 113. | Pyr-Ser-Trp-Pro-Gly-Pro-Asn-Ile-Pro-Pro |
| 68. | Chc-Trp-Pro-Gly-Pro-Nle-βHphe-Ala-Pro | | 114. | Pyr-Nle-Trp-Pro-Gly-Pro-Asn-Ile-Pro-Pro |
| 69. | Pyr-Trp-Pro-Arg-Pro-Gln-Ile-Pro-Pro | | 115. | Pyr-Asn-Trp-Pro-Arg-Pro-Gln-Ile-Pro-Pro |
| 70. | Pyr-Trp-Pro-His-Pro-Gln-Ile-Pro-Pro | | 116. | Pyr-Ser-Trp-Pro-Arg-Pro-Gln-Ile-Pro-Pro |
| 71. | Pyr-Trp-Pro-Lys-Pro-Gln-Ile-Pro-Pro | | 117. | Pyr-Nle-Trp-Pro-Arg-Pro-Gln-Ile-Pro-Pro |
| 72. | Pyr-Trp-Pro-Gly-Pro-Gln-Ile-Pro-Pro | | 118. | Pyr-Asn-Trp-Pro-His-Pro-Gln-Ile-Pro-Pro |
| 73. | Pyr-Trp-Pro-Arg-Pro-Asn-Ile-Pro-Pro | | 119. | Pyr-Ser-Trp-Pro-His-Pro-Gln-Ile-Pro-Pro |
| 74. | Pyr-Trp-Pro-His-Pro-Asn-Ile-Pro-Pro | | 120. | Pyr-Nle-Trp-Pro-His-Pro-Gln-Ile-Pro-Pro |
| 75. | Pyr-Trp-Pro-Lys-Pro-Asn-Ile-Pro-Pro | | 121. | Pyr-Asn-Trp-Pro-Lys-Pro-Gln-Ile-Pro-Pro |
| 76. | Pyr-Trp-Pro-Gly-Pro-Asn-Ile-Pro-Pro | | 122. | Pyr-Ser-Trp-Pro-Lys-Pro-Gln-Ile-Pro-Pro |
| 77. | Pyr-Trp-Pro-Arg-Pro-Lys-Phe-Ala-Pro | | 123. | Pyr-Nle-Trp-Pro-Lys-Pro-Gln-Ile-Pro-Pro |
| 78. | Pyr-Trp-Pro-Arg-Pro-Nle-Ile-Ala-Pro | | 124. | Pyr-Asn-Trp-Pro-Gly-Pro-Gln-Ile-Pro-Pro |
| 79. | Pyr-Trp-Pro-Arg-Pro-Nle-Phe-Ala-Pro | | 125. | Pyr-Ser-Trp-Pro-Gly-Pro-Gln-Ile-Pro-Pro |
| 80. | Pyr-Trp-Pro-Arg-Pro-Gln-Ile-Ala-Pro | | 126. | Pyr-Nle-Trp-Pro-Gly-Pro-Gln-Ile-Pro-Pro |
| 81. | Pyr-Trp-Pro-Arg-Pro-Gln-Phe-Ala-Pro | | 127. | Pyr-Lys-Trp-Pro-Arg-Pro-Gln-Ile-Pro-Pro |
| 82. | Pyr-Trp-Pro-Orn-Pro-Nle-Ile-Ala-Pro | | 128. | Pyr-Glu-Trp-Pro-Arg-Pro-Gln-Ile-Pro-Pro |
| 83. | Pyr-Trp-Pro-Orn-Pro-Nle-Phe-Ala-Pro | | 129. | Pyr-Trp-Pro-Arg-Pro-Thr-Pro-Gln-Ile-Pro-Pro |
| 84. | Pyr-Trp-Pro-Orn-Pro-Gln-Ile-Ala-Pro | | 130. | Pyr-Trp-Pro-Arg-Pro-Gly-Pro-Gln-Ile-Pro-Pro |
| 85. | Pyr-Trp-Pro-Orn-Pro-Gln-Phe-Ala-Pro | | 131. | Pyr-Trp-Pro-Arg-Pro-Thr-Pro-Glu-Ile-Pro-Pro |
| 86. | Pyr-Trp-Pro-D-Arg-Pro-Gln-Ile-Pro-Pro | | 132. | Pyr-Trp-Pro-Arg-Pro-Gly-Pro-Glu-Ile-Pro-Pro |
| 87. | Pyr-Trp-Pro-Arg-Pro-Gln-Phe-Pro-Pro | | 133. | Pyr-Gly-Gly-Trp-Pro-Arg-Pro-Gly-Pro-Gln-Ile-Pro-Pro |
| 88. | Pyr-Trp-Pro-Arg-Pro-Nle-Ile-Pro-Pro | | 134. | Pyr-Gly-Gly-Trp-Pro-Arg-Pro-Gly-Pro-Glu-Ile-Pro-Pro |
| 89. | Pyr-Trp-Pro-Arg-Pro-Nle-Phe-Pro-Pro | | 135. | Dac-Gly-Phe-Ala-Pro |
| 90. | Pyr-Trp-Pro-Orn-Pro-Nle-Ile-Pro-Pro | | 136. | Cac-Lys-Phe-Ala-Pro |
| 91. | Pyr-Trp-Pro-Orn-Pro-Nle-Phe-Pro-Pro | | 137. | Cbc-Lys-Phe-Ala-Pro |
| 92. | Pyr-Trp-Pro-Orn-Pro-Gln-Ile-Pro-Pro | | 138. | Cpc-Lys-Phe-Ala-Pro |
| 93. | Pyr-Trp-Pro-Orn-Pro-Gln-Phe-Pro-Pro | | 139. | Chc-Lys-Phe-Ala-Pro |
| 94. | Pyr-Tyr-Pro-Arg-Pro-Gln-Ile-Pro-Pro | | 140. | Pyr-Trp-Pro-Arg-Pro-Glu-Phe-Pro-Pro |
| 95. | Pyr-Gly-Pro-Arg-Pro-Gln-Ile-Pro-Pro | | | |
| 96. | Pyr-Leu-Pro-Arg-Pro-Gln-Ile-Pro-Pro | | | |
| 97. | Pyr-D-Trp-Pro-Arg-Pro-Gln-Ile-Pro-Pro | | | |
| 98. | Pyr-Trp-Pro-Arg-Pro-Gln-Ile-Pro-Pro | | | |
| 99. | Pyr-Phe-Pro-Arg-Pro-Gln-Ile-Pro-Pro | | | |
| 100. | Bzl<br>\|<br>Pyr-Tyr-Pro-Arg-Pro-Gln-Ile-Pro-Pro | | | |
| 101. | Pyr-Lys-Phe-Ala-Pro-Gln-Ile-Pro-Pro | | | |
| 102. | Pyr-Trp-Pro-Gly-Pro-Glu-Ile-Pro-Pro | | | |
| 103. | Pyr-Asn-Trp-Pro-Arg-Pro-Asn-Ile-Pro-Pro | | | |
| 104. | Pyr-Ser-Trp-Pro-Arg-Pro-Asn-Ile-Pro-Pro | | | |
| 105. | Pyr-Nle-Trp-Pro-Arg-Pro-Asn-Ile-Pro-Pro | | | |

Certain of the intermediates of the present invention themselves inhibit the enzymatic conversion of angiotensin I into angiotensin II. These peptides are the following:

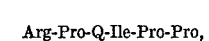

wherein Q is as defined previously,

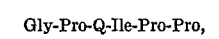

wherein Q is as defined previously,

Pro-Gly-Pro-Gln-Ile-Pro-Pro,

Arg-Pro-Thr-Pro-Gln-Ile-Pro-Pro,

Trp-Pro-Gly-Pro-Gln-Ile-Pro-Pro,

Arg-Pro-Gly-Pro-Gln-Ile-Pro-Pro,

Pro-Arg-Pro-Thr-Pro-Gln-Ile-Pro-Pro,

Pro-Arg-Pro-Gly-Pro-Gln-Ile-Pro-Pro, and

Trp-Pro-Arg-Pro-V-Pro-Gln-Ile-Pro-Pro-wherein V is as defined previously.

The compounds of the present invention are capable of inhibiting the enzymatic conversion of angiotensin I into angiotensin II when employed at a concentration of from about 0.05 to about 10 μg./ml. or of inhibiting the hypertensive effect of angiotensin I when administered in a dosage level of from about 0.5 to about 10 mg./kg. For the latter purpose they may be administered parenterally by incorporating the appropriate dosage with a physiologically-acceptable carrier.

The compounds of the present invention may be used per se or in the form of their physiologically-acceptable peptide salts. Examples of such salts are acid-addition salts, such as, for example, hydrochloride, hydrobromide, acetate, and haloacetate such as trifluoroacetate and dichloroacetate.

Certain of the compounds of the present invention absorb ultraviolet light in the right 2950–3150 A. As such they may be employed topically as sunscreen agents to protect the skin against exposure to sunlight. A suntan lotion or cream is obtained by incorporating one or more of the hereinafter mentioned UV absorbing compounds in the appropriate vehicle in which parts given are by weight:

Suntan Lotion Vehicle:
    2.0 polyethylene glycol 1500
    20.0 polyethylene glycol 400
    0.1 menthol
    40.0 denatured alcohol
    0.25 perfume
    2.0 diethylene glycol monostearate
    q.s. distilled or deionized water to make 100.0

Suntan Cream Vehicle:
    1.5 stearic acid
    6.0 isopropyl myristate
    1.75 ozokerite 170
    0.2 preservative
    0.25 perfume
    1.0 triethanolamine
    q.s. distilled or deionized water to make 100.0

Those compounds which absorb UV are listed below by number wherein the number refers to the foregoing listing of peptides of the present invention:

2, 3, 8, 9, 10, 11, 12, 24, 25, 26, 27, 28, 29, 30, 31, 34, 35, 36, 37, 38, 39, 40, 48, 49, 55, 56, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 97, 98, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 140.

Various intermediates of the present invention are employed in protected form. While only certain protected forms have been specifically disclosed in accordance with the requirements of optimal results in specific synthesis, it is to be understood that other protecting groups may also be used in accordance with the skill of the art. The choice of amino protecting group will depend on various factors, e.g., the nature of the amino acid or peptide which is to be attached to the N-terminal group of the amino acid or peptide, the ease of removal of the protecting group, reaction solvent, temperature, etc. Some commonly used amino protecting groups are the following:

1. amine hydrochlorides
2. the p-toluenesulfonyl group
3. the benzyloxycarbonyl (carbobenzoxy) group
4. substituted benzyloxycarbonyl and other urethane protecting groups
5. the trifluoroacetyl group
6. the phthalyl (or phthaloyl) group
7. the diphenylmethyl (benzhydryl) and triphenylmethyl (trityl) groups
8. the formyl group
9. lactams
10. Schiff bases and enamines
11. the benzylsulfonyl group
12. tritylsulfenyl and arylsulfenyl.

Some specific protecting groups are tert.-butyloxycarbonyl, o-nitrophenylsulfenyl, and tosyl. A more complete listing may be obtained by reference to standard works on peptide synthesis, e.g., Bodanszky et al., "Peptide Synthesis," Chapter 4, Interscience, 1966, or Schroder et al., "The Peptides," Vol. 1, pp. xxiii–xxix, Academic Press, 1965.

Examples of suitable hydroxyl protecting groups are, for example, benzyl, t-butyl, and tetrahydropyranyl.

The C-terminal group may also be protected. In the compounds of all three categories, other functional groups, e.g. hydroxyl and guanidino, as well as amino groups other than the N-terminal amino and carboxyl groups other than the C-terminal carboxyl, may also be protected.

The choice of carboxyl protecting group will depend on various factors, e.g., the nature of the peptide being synthesized, ease of removal of protecting group, reaction solvent, temperature, etc.

Some commonly used carboxyl protecting groups are the following:

1. salt formation
2. lower alkyl ester
3. phenyl substituted lower alkyl esters, e.g., benzyl and benzhydryl esters
4. p-nitrobenzyl esters
5. p-methoxybenzyl esters
6. phthalimidomethyl esters
7. tertiary butyl esters
8. cyclopentyl esters
9. methylthioethyl esters
10. trimethylsilyl group
11. hydrazides Some specific carboxyl protecting groups are methyl, ethyl, propyl, tert.-butyl, and benzyl. A more complete listing may be obtained by reference to standard works on peptide synthesis, e.g. Bodanszky et al., supra, or Schroder et al., supra.

Examples of suitable guanidine protecting groups are, for example, nitro, tosyl, p-nitrobenzyloxycarbonyl, adamantylcarbonyl, and protonation. A more complete listing of hydroxyl and guanidine protecting groups may be had by reference to standard works on peptide synthesis, for example, the previously mentioned Bodanszky et al. or Schroder et al. texts.

The following examples illustrates the invention without, however, limiting the same thereto. All temperatures given are in degrees Celsius. Unless otherwise indicated, all optical amino acids are of the L-configuration.

EXAMPLE 1

Pyr-Tyr-Pro-Arg-Pro-Gln-Ile-Pro-Pro

1. Tyr-Pro·trifluoroacetate.—Proline tert.-butyl ester (0.80 g.) and tert.-butyloxycarbonyl tyrosine 2,4,5-trichlorophenyl ester (2.38 g.) are dissolved in a mixture of 20 ml. of dichloromethane and 1 ml. of dimethylformamide (DMF). After 24 hours, the reaction mixture is diluted with dichloromethane, washed with aqueous acid and base and the solvent evaporated *in vacuo*. The residue is dissolved in trifluoroacetic acid. After one hour at room temperature the solvent is removed *in vacuo*. The residue is triturated with ether until solidification.

2. Pyr-Tyr-Pro.—The above dipeptide (1.2 g.) and pyroglutamic acid 2,4,5-trichlorophenyl ester (1.1 g.) are dissolved in a mixture of 0.5 ml. of triethylamine (TEA) and DMF (15 ml.). After 16 hours at room temperature, the solvent is removed *in vacuo*, the residue dissolved in isopropanol and the solution poured into diisopropyl ether with stirring. The solid precipitate is filtered and washed with isopropyl ether.

3. Z-Pro-Pro-OBu$^t$.—Benzyloxycarbonyl - L - proline (69.72 g.) and proline tert.-butyl ester (49 g.) are dissolved in 560 ml. of dichloromethane (DCM) and the solution chilled in an ice-water bath for 10 minutes. Dicyclohexylcarbodiimide (57.68 g.) is added and the mixture stirred for 1 hour at 5° and 4 hours at room temperature. The dicyclohexylurea is removed by filtration and the filtrate diluted with DCM (850 ml.) and washed twice with 20% citric acid, twice with water, twice with saturated sodium bicarbonate and twice with water. After drying over sodium sulfate, the solvent is removed *in vacuo* and the solid residue crystallized from 4 liters of hexane.

4. Z-Ile-Pro-Pro-OBu$^t$.—Benzyloxycarbonyl-L-prolyl-L-proline tert.-butyl ester (46.5 g.) is dissolved in a mixture of absolute ethanol (750 ml.) and N HCl (122 ml.) and hydrogenated over 10% palladium on charcoal (8 g.) until no more carbon dioxide is evolved (4 hours). Thin layer chromatography is utilized to check for the complete removal of the protecting group. The catalyst is removed by filtration and the filtrate concentrated to dryness to constant weight (ca. 37 g.). This residue is dissolved in DMF (195 ml.) and the solution neutralized with TEA (17.1 ml.) while stirring and cooling in an ice-water bath. Immediately following this neutralization benzyloxycarbonyl - L - isoleucine N-hydroxysuccinimido ester (50.5 g., m.p. 114–116°) is added. The reaction is allowed to proceed overnight at room temperature (ninhydrin test becomes negative). Dimethylaminopropylamine (7.7 ml.) is added and after 2 more hours at room temperature the excess basicity is neutralized with acetic acid. After concentration *in vacuo* to half volume, the reaction mixture is diluted with ethyl acetate (1.5 l.) and washed twice with 20% citric acid, twice with water, twice with saturated sodium bicarbonate and three times with water. The organic phase is dried over Na$_2$SO$_4$ and the solvent removed *in vacuo* until constant weight.

5. Z-Gln-Ile-Pro-Pro-OBu$^t$.—Benzyloxycarbonyl-L-isoleucyl-L-prolyl-L-proline tert.-butyl ester (58 g.) is dissolved in a mixture of absolute ethanol (1.2 l.) and N HCl (.116 ml.) and hydrogenated over 10% palladium on charcoal (10 g.) until no more carbon dioxide is evolved (5 l.). Completion of the deprotection is checked by thin layer chromatography. The catalyst is filtered off and the filtrate concentrated to dryness *in vacuo* (50.9 g.). This residue is dissolved in DMF (175 ml.) and the solution neutralized with TEA (16.2 ml.) while stirring and cooling in an ice-water bath. Immediately after neutralization, benzyloxycarbonyl-L-glutamine p-nitrophenyl ester (49.6 g.) is added and the reaction allowed to proceed overnight at room temperature (ninhydrin test becomes negative). Dimethylaminopropylamine (4.1 ml.) is added and after 2 hours the excess basicity is neutralized with acetic acid and the reaction mixture concentrated to one-third of the original volume *in vacuo*. Ethyl acetate (2.5 l.) is added and the solution thus obtained is washed twice with 20% citric acid, twice with water, about 15 times with 0.5 N NH$_4$OH (until the ammonium hydroxide solution is practically colorless) and five times with water. After drying over sodium sulfate, the solvent is removed *in vacuo* and the residue crystallized from ethyl acetate.

6. Z-Pro-Gln-Ile-Pro-Pro-OBu$^t$.—Benzyloxycarbonyl-L-glutaminyl-L-isoleucyl-L-prolyl-L-proline tert.-butyl ester (50 g., 92 mmole) is dissolved in a mixture of absolute ethanol (1.2 l.) and N HCl (93 ml.) and hydrogenated as described previously. The tetrapeptide ester hydrochloride (58 g.) is dissolved in DMF (160 ml.) and the solution neutralized with TEA (13.0 ml.) while stirring and cooling in an ice-water bath. Immediately after neutralization benzyloxycarbonyl - L - proline hydroxysuccinimido ester (45 g., m.p. 90–91°) is added and the reaction allowed to proceed overnight at room temperature (ninhydrin test becomes negative). Dimethylaminopropylamine (11.1 ml.) is added and after 2 hours the excess basicity is neutralized with acetic acid and the reaction mixture concentrated to ⅓ its original volume. Ethyl acetate (1.5 l.) is added and the solution is washed three times with 20% citric acid, twice with water, twice with saturated sodium bicarbonate, and three times with water. After drying over sodium sulfate, the solvent is evaporated *in vacuo* and the gelatinous residue dissolved in ethanol, concentrated to dryness again, redissolved in ethanol (75 ml.) and added slowly to 1.6 l. of ether with vigorous stirring. The stirring is continued for 20 minutes and the precipitate filtered and washed with ether. The product is obtained as a glassy powder after drying in a desiccator.

7. Z-Arg(NO$_2$)-Pro-Gln-Ile-Pro-Pro-OBu$^t$.—Benzyloxycarbonyl - L - prolyl - L - glutaminyl - L - isoleucyl - L - prolyl-L-proline tert.-butyl ester (17.76 g., 24 mmoles) is dissolved in a mixture of absolute ethanol (480 ml. and N HCl (26.4 ml.) and hydrogenated as described previously. The pentapeptide tert.-butyl ester hydrochloride (17 g.) is dissolved in DMF (36 ml.) and neutralized with TEA (3.84 ml.) while stirring and cooling in an ice-water bath. Immediately following the neutralization, benzyloxycarbonylnitro-L-arginine 2,4-dinitrophenyl ester (13.8 g.) is added and the reaction allowed to proceed at room temperature. After 1 hour TEA (2 ml.) is added and the reaction stored at room temperature overnight. Dimethylaminopropylamine (2 ml.) is added and after one hour the reaction mixture is concentrated to ⅓ of its original volume, diluted with ethyl acetate (1200 ml.) and washed twice with 20% citric acid, once with water, ten times with ammonia (400 ml. each, not all the yellow color disappears), and three times with water. After drying with sodium sulfate, the ethyl acetate is removed *in vacuo* to a heavy oil that solidifies upon trituration with ether (500 ml.). The solid is filtered, washed with ether and dried.

8. Arg-Pro-Gln-Ile-Pro-Pro·2HCl.— Benzyloxycarbonylnitro - L - arginyl - L-prolyl-L-glutaminyl-L-isoleucyl-L-prolyl-L-proline tert.-butyl ester (21.4 g.) is dissolved in trifluoroacetic acid (150 ml.) and the solution kept at room temperature for one hour. The solution is concentrated to 30 ml. *in vacuo* and 1 liter of ether added. The precipitate is filtered, washed with ether and dried *in vacuo*. This protected hexapeptide acid (20.3 g.) is dissolved in a mixture of methanol (800 ml.), water (400 ml.) and N HCl (46 ml.) and hydrogenated with 10% palladium on charcoal (4 g.) for 20 hours. The completion of hydrogenolysis is asecrtained by the disappearance of the UV absorption at 270 mµ. The catalyst is removed by filtration and the filtrate concentrated *in vacuo*. The residue is dissolved in methanol (70 ml.) and added to ether (1.5 l.) with vigorous stirring. The precipitate is filtered and washed with ether.

9. Pyr-Tyr-Pro-Arg-Pro-Gln-Ile-Pro-Pro.—The tripeptide, Pyr-Tyr-Pro (23.3 mmoles) is dissolved in DMF (85 ml.) and 3.27 ml. (23.3 mmoles) TEA, the solution cooled to −20° (inside the flask, or −35 to −40° in the cooling bath) and kept at this temperature for 15–20 minutes. To this cold solution 3.19 ml. of isobutyloxycarbonyl chloride is added and then a time of 30 minutes is allowed for the mixed anhydride to be formed at the same temperature. A solution of Arg-Pro-Gln-Ile-Pro-Pro (16.5 g.) in DMF (100 ml.) is precooled to about 0° and then added into the solution of the mixed anhydride. At this moment, the pH value is adjusted to 8 with TEA (8.5 ml.) while the temperature of 0° is maintained. After 20 to 24 hours at room temperature, the volume of the solvents is reduced to ⅓–¼ and poured into 20–25 volumes of EtOAc containing 3% of AcOH. The precipitate is washed thoroughly with EtOAc and then dried *in vacuo* over KOH overnight.

EXAMPLE 2

Cpc-Phe-Pro-Arg-Pro-Gln-Ile-Pro-Pro

1. Z-Phe-Pro-OBt.—Following the procedure of paragraph 3 of Example 1, but substituting benzyloxycarbonyl-L-phenylalanine (0.28 mole) for benzyloxycarbonyl-L-proline, the foregoing dipeptide is obtained.

2. Cpc-Phe-Pro.—The dipeptide of the preceding paragraph (9.0 g.) is hydrogenated as described in paragraph 4 of Example 1, and the resulting dipeptide hydrochloride (7.1 g.) is allowed to react with cyclopentane carboxylic acid (2.3 g.), dicyclohexylcarbodiimide (4.1 g.) and TEA (2.8 mmole). The product is isolated as described in paragraph 3 of Example 1. The tertiary butyl ester is hydrolyzed by treatment with trifluoroacetic acid as described in paragraph 8 of Example 1.

3. Cpc-Phe-Pro-Arg-Pro-Gln-Ile-Pro-Pro.— The nonapeptide is obtained by coupling the tripeptide of paragraph 2 to the hexapeptide prepared as described in paragraph 8 of Example 1 following the procedure of paragraph 9 of Example 1.

EXAMPLE 3

Cpc-Trp-Pro-Arg-Pro-Gln-Ile-Pro-Pro

1. Trp-Pro·trifluoroacetate.—Following the procedure of paragraph 1 of Example 1 but substituting tert.-butyloxycarbonyl tryptophane 2,4,5-trichlorophenyl ester (2.62 g.) for tert.-butyloxycarbonyl tyrosine 2,4,5-trichlorophenyl ester, the foregoing dipeptide is obtained.

2. Cpc-Trp-Pro.—The dipeptide of the preceding paragraph (1.32 g.) and cyclopentane carboxylic acid hydroxysuccinimido ester are dissolved in a mixture of TEA (0.5 ml.) and DMF (15 ml.). After 16 hours at room temperature, the solvent is removed *in vacuo*, the residue dissolved in isopropanol and the solution poured into diisopropyl ether with stirring. The solid precipitate is filtered and washed with isopropyl ether.

3. Cpc-Trp-Pro-Arg-Pro-Gln-Ile-Pro-Pro.—The tripeptide from the preceding paragraph (9.3 g.) is dissolved in DMF (85 ml.) and 3.27 ml. TEA. The solution is cooled to −20° inside the flask, or −35° to −40° in the cooling bath, and kept at this temperature for 15–20 minutes. To the cold solution is added 3.19 ml. of isobutyloxycarbonyl chloride and 30 minutes are allowed for the mixed anhydride to form at this temperature. A solution of the hexapeptide (16.5 g.) in DMF (100 ml.) prepared as described in paragraph 8 of Example 1 which has been precooled to about 0° C. is then added to the solution of the mixed anhydride. At this moment the pH value is adjusted to 8 with TEA (8.5 ml.) while the temperature of 0° is maintained. After 22 hours at room temperature, the volume of the solvents is reduced to about 4 and poured into 20 volumes of EtOAc containing 3% of AcOH. The precipitate is washed thoroughly with EtOAc and then dried *in vacuo* over KOH overnight.

EXAMPLE 4

Bzl
|
Pyr-Tyr-Pro-Arg-Pro-Gln-Ile-Pro-Pro

Bzl
|
1. Tyr-Pro·trifluoroacetate.—Following the procedure of paragraph 1 of Example 1 but substituting tert.-butyloxycarbonyl-O-benzyl tyrosine 2,4,5-trichlorophenyl ester (2.86 g.) for tert. - butyloxycarbonyl tyrosine 2,4,5-trichlorophenyl ester, the foregoing dipeptide is obtained.

Bzl
|
2. Pyr-Tyr-Pro.—The depeptide of the preceding paragraph (1.95 g.) and pyroglutamic acid 2,4,5-trichlorophenyl ester (1.1 g.) are coupled to yield the foregoing tripeptide following the procedure of paragraph 2 of Example 3.

Bzl
|
3. Pyr-Tyr-Pro-Arg-Pro-Gln-Ile-Pro-Pro.—The foregoing nonapeptide is prepared by coupling according to the procedure of paragraph 3 of Example 3 the tripeptide of paragraph 2 with the hexapeptide prepared as described in paragraph 8 of Example 1.

EXAMPLE 5

Bzl
|
Cpc-Tyr-Pro-Arg-Pro-Gln-Ile-Pro-Pro

Bzl
|
1. Cpc-Tyr-Pro.—The foregoing tripeptide is prepared by coupling the dipeptide (3.5 g.) prepared as described in paragraph 1 of Example 4 with cyclopentanecarboxylic acid N-hydroxysuccinimido ester (2.3 g.) following the procedure of paragraph 2 of Example 2.

Bzl
|
2. Cpc-Tyr-Pro-Arg-Pro-Gln-Ile-Pro-Pro.—The foregoing nonapeptide is prepared by coupling according to the procedure of paragraph 3 of Example 3 the tripeptide (12.1 g.) of paragraph 1 with the hexapeptide (16.5 g.) prepared as described in paragraph 8 of Example 1.

EXAMPLE 6

Cpc-Tyr-Pro-Arg-Pro-Gln-Ile-Pro-Pro

The nonapeptide of Example 5 (500 mg.) is dissolved in a mixture of ethanol-water (9:1; 100 ml.) and hydrogenated over 10% Pd on charcoal for 5 hours. The catalyst is filtered off and the filtrate concentrated to dryness *in vacuo*. The residue is dissolved in water and freeze-dried.

EXAMPLE 7

Cac-Phe-Ala-Pro

The title compound is prepared according to the following series of reactions starting with 5 g of tert.-butyloxycarbonyl-proline polystyrene divinylbenzene copolymer resin containing 0.5 mmoles of proline per gram of resin:

(1) Wash four times with dichloromethane (50 ml. each wash), four times with ethanol (50 ml. each wash), and four times with acetic acid (50 ml. each wash).

(2) Wash once with 1 N HCl in acetic acid (50 ml.) for 5 minutes, and wash again for 25 minutes (50 ml.).

(3) Wash four times with acetic acid (50 ml. each wash), four times with absolute ethanol (50 ml. each wash), and four times with chloroform (50 ml. each wash).

(4) Wash twice with 50 ml. of a mixture containing 3.2 ml. of triethylamine in 50 ml. of chloroform.

(5) Wash four times with chloroform (50 ml. each wash) and four times with dichloromethane (50 ml. each wash).

(6) Couple with tert.-butyloxycarbonyl alanine (7.5 mmoles) and dicyclohexylcarbodiimide (7.5 mmoles) in dichloromethane (39 ml.). Alternately, a mixture of dichloromethane and dimethylformamide (2:1) may be used.

7) Repeat steps 1–6, inclusive, but employing tert.-butyloxycarbonyl phenylalanine (7.5 mmoles) in step 6.

(8) Repeat steps 1–6, inclusive, but employing chloroacetic acid (7.5 mmoles) in step 6.

(9) The Cac-Phe-Ala-Pro resin is suspended in trifluoroacetic acid (65 ml.) and hydrogen bromide is bubbled through for 30 minutes. The resin is filtered off and the filtrate is concentrated to dryness *in vacuo*. The residue is triturated with ether and the solid precipitate formed is filtered, washed with ether and dried.

EXAMPLE 8

Pyr-Trp-Ala-Pro

Starting with 1.0 g. of tert.-butyloxycarbonyl-proline polystyrene resin containing 0.2 mmoles of proline per gram of resin and following the procedure of Example 7, except that after the introduction of the tryptophyl residue, the wash solution in step 2 contains 40.4 ml. acetic acid, 9.1 ml. anisole, and 0.5 ml. mercaptoethanol, the following amino acids are introduced stepwise: alanine, tryptophane, and pyroglutamic acid. The tert.-butyloxycarbonyl group is used for protection of the N-terminal amino groups except for Pyr. To remove the tetrapeptide, the resin is suspended in a mixture of trifluoroacetic acid (13 ml.), mercaptoethanol (2.8 ml.) and anisole (0.13 ml.); chilled in an ice-water bath; and HBr is bubbled through for 30 minutes.

EXAMPLE 9

Pyr-Lys-Trp-Ala

The title compound is prepared following the procedure of Example 8 starting with tert.-butyloxycarbonyl-alanine polystyrene resin, but introducing the following amino acids stepwise: tryptophane, lysine and pyroglutamic acid.

EXAMPLE 10

Pyr-Trp-Pro-Arg-Pro-Lys-Phe-Ala-Pro

Starting with tert.-butyloxycarbonyl proline polystyrene resin (0.5 mmoles of proline per gram of resin), the series of reactions described in Example 7 are repeated sequentially for the introduction of Boc-Ala, Boc-Phe, α-Boc-ε-Z-Lys, Boc-Pro, α-Boc-ω-Nitro-Arg, Boc-Pro, Boc-Trp, and Pyr. After the tryptophan residue is introduced in the peptide chain, all acidolytic treatments are carried out in the presence of mercaptoethanol and anisole. The removal of the peptide from the resin is carried out as in Example 7 but with the addition of 1% mercaptoethanol and 18% anisole. The remaining protecting groups are then removed by hydrogenolysis.

EXAMPLE 11

Pyr-Nle-Phe-Ala-Pro

The title compound is prepared by the procedure described in Example 7 utilizing the tert.-butyloxycarbonyl derivatives of the corresponding amino acids, except for Pyr.

EXAMPLE 12

Pyr-Gln-Phe-Ala-Pro

The title compound is prepared as described in Example 7 employing the tert.-butyloxycarbonyl derivatives of the corresponding amino acids, except for Pyr. In the case of glutamine, the p-nitrophenyl ester is used instead of the dicyclohexyl-carbodiimide procedure.

EXAMPLE 13

Pyr-Glu-Phe-Ala-Pro

The title compound is prepared as described in Example 7 employing the tert.-butyloxycarbonyl derivatives of the corresponding amino acids, except for Pyr.

EXAMPLE 14

Pyr-Lys-Ile-Ala-Pro

The title compound is prepared as described in Example 7 employing the tert.-butyloxycarbonyl derivatives of the corresponding amino acids, except for Pyr.

EXAMPLE 15

Pyr-Lys-Pro-Ala-Pro

The title compound is prepared as described in Example 7 employing the tert.-butyloxycarbonyl derivatives of the corresponding amino acids, except for Pyr.

EXAMPLE 16

Pyr-Lys-Ser-Ala-Pro

The title compound is prepared as described in Example 7 employing the tert.-butyloxycarbonyl derivatives of the corresponding amino acids, except for Pyr.

EXAMPLE 17

Pyr-Lys-Phe-Gly-Pro

The title compound is prepared as described in Example 7 employing the tert.-butyloxycarbonyl derivatives of the corresponding amino acids, except for Pyr.

EXAMPLE 18

Pyr-Lys-Phe-Pro-Pro

The title compound is prepared as described in Example 7 employing the tert.-butyloxycarbonyl derivatives of the corresponding amino acids, except for Pyr.

EXAMPLE 19

Pyr-Lys-Phe-Lac-Pro

The title compound is prepared as described in Example 7 employing the tert.-butyloxycarbonyl derivatives of Phe-Lac, ε-Z-Lys, and pyroglutamic acid without protecting group.

EXAMPLE 20

Pyr-Lys-Phe-Ala-Asp

The title compound is prepared starting from tert.-butyloxycarbonyl-O-benzyl-aspartylpolystyrene resin (0.5 mmole/g.) following the procedure described in Example 7 and employing the tert.-butyloxycarbonyl derivatives of the corresponding amino acids, except for Pyr.

EXAMPLE 21

Pyr-Lys-Phe-Ala-Glu

The title compound is prepared starting with tert.-butyloxycarbonyl - O-benzyl-L-glutamyl-polystyrene resin following the procedure described in Example 7 and utilizing the tert.-butyloxycarbonyl derivatives of the corresponding amino acids, except for Pyr.

EXAMPLE 22

Cac-Lys-Phe-Ala-Pro

The title compound is prepared by the procedure described in Example 7 utilizing the tert.-butyloxycarbonyl derivatives of the corresponding amino acids, except for Pyr, and chloroacetic acid.

EXAMPLE 23

Dac-Gly-Phe-Ala-Pro

1. Boc-Ala-Pro-OBzl.—Proline benzyl ester hydrochloride (20.5 g.) is dissolved in dimethylformamide (425 ml.). The solution is cooled to 0° C. and TEA (12.4 ml.) and tert.-butyloxycarbonyl-alanine p-nitrophenyl ester (25 g.) are added. After 21 hours at room temperature, the solvent is removed in vacuo and the residue dissolved in ethyl acetate and washed with 20% aqueous citric acid, water, saturated solium bicarbonate and water. The organic phase is dried over sodium sulfate and the solvent removed in vacuo. The residue is dissolved in ether and the product precipitated by addition of hexane.

2. Z-Phe-Ala-Pro-OBzl.—The protected dipeptide of paragraph 1 is treated with trifluoroacetic acid and the resulting dipeptide benzyl ester (8.7 g.) is dissolved in a mixture of dimethylformamide (105 ml.), TEA (3.19 ml.) and benzyloxycarbonyl-phenylalanine-p-nitrophenyl ester (10.4 g.). After 18 hours, the reaction mixture is worked up as described in paragraph 1.

3. Phe-Ala-Pro.—The protected tripeptide of paragraph 2 (9.9 g.) is suspended in a mixture of methanol (225 ml.), water (25 ml.) and acetic acid (10 ml.). After addition of 10% palladium on charcoal (2.5 g.) the mixture is hydrogenated at normal pressure and room temperature for five hours. The catalyst is filtered off, the filtrate concentrated to dryness *in vacuo* and the residue purified from isopropanol-isopropyl ether.

4. Dac-Gly-Phe-Ala-Pro.—The tripeptide of paragraph 3 (420 mg.) is dissolved in a mixture of dimethylformamido (5 ml.), TEA (0.15 ml.) and diazocetylglycine-p-nitrophenyl ester (316 mg.). After 18 hours at 5° C., the solution is poured with stirring into isopropyl ester (100 ml.) and the precipitate filtered and washed with ethyl acetate.

EXAMPLE 24

Dac-Gly-Gly-Phe-Ala-Pro

1. Boc-Gly-Phe-Ala-Pro.—The tripeptide of paragraph 3 of Example 23 (1.2 g.) is dissolved in a mixture of DMF (15 ml.), TEA (0.5 ml.) and tert.-butyloxycarbonyl-glycyl-p-nitrophenyl ester. After 15 hours at room temperature, the reaction mixture is worked up as described in paragraph 1 of Example 23.

2. Dac-Gly-Gly-Phe-Ala-Pro.—The partially protected tetrapedtide of paragraph 1 is treated with trifluoroacetic acid as described in paragraph 2 of Example 23. Glycyl-phenylalanyl-alanyl-proline trifluoroacetic is allowed to react with diazoacetylglycine-p-nitrophenyl ester as described in paragraph 4 of Example 23.

EXAMPLE 25

Pyr-Trp-Pro-Arg-Pro-Gln-Ile-Ala-Pro

The title compound is prepared by the procedure described in Example 7 utilizing the tert.-butyloxycarbonyl derivatives of the corresponding amino acids, except for Pyr. In the case of glutamine the p-nitrophenyl ester is used for the coupling step.

EXAMPLE 26

Pyr-Trp-Pro-D-Arg-Pro-Gln-Ile-Pro-Pro

The title compound is prepared as described in Example 7 utilizing the tert.-butoyloxycarbonyl derivatives of the corresponding amino acids, except for Pyr. In the case of glutamine the p-nitrophenyl ester is used for the coupling step.

EXAMPLE 27

Cpc-Lys-Phe-Ala-Pro

1. Boc-Phe-Ala-Pro-OBzl.—The protected peptide prepared as described in paragraph 1 of Example 23 (20 g.) is dissolved in cold trifluoroacetic acid (200 ml.). After 20 minutes at room temperature most of the trifluoroacetic acid is removed *in vacuo*. The oily residue is solidified by trituration with ether. This dipeptide ester trifluoroacetate is dissolved in a mixture of DMF (250 ml.), TEA (7.35 ml.) and tert. - butyloxycarbonyl - phenylalanine p-nitrophenyl ester (22 g.). After 24 hours at room temperature, the reaction mixture is worked up as described in Example 23.

Boc
|
2. Z-Lys-Phe-Ala-Pro-OBzl.—The protected tripeptide of paragraph 1 is treated with trifluoroacetic acid and the resulting tripeptide benzyl trifluoroacetate (10.2 g.) is dissolved in a mixture of dimethoxyethane (110 ml.), TEA (2.71 ml.) and N$^\alpha$-benzyloxycarbonyl-N$^\epsilon$-tert.-butyloxycarbonyl-lysine-N-hydroxy-succinimide ester (10 g.). After 22 hours at room temperature, the solvent is removed *in vacuo* and the residue triturated with cold water (100 ml.), filtered and the protected tetrapeptide ester crystallized from absolute ethanol.

Boc
|
3. Lys - Phe - Ala-Pro.—The proteceted tetrapeptide of paragraph 2 (3.2 g.) is supended in a mixture of methanol (100 ml.), water (10 ml.), and acetic acid (2.2 ml.). After addition of 10% palladium on charcoal (1.1 g.) the mixture is hydrogenated at normal pressure and room temperature for five hours. The catalyst is filtered off and the filtrate concentrated to dryness *in vacuo* and the residue crystallized from absolute ethanol.

Boc
|
4. Cpc - Lys - Phe - Ala-Pro.—The partially protected tetrapeptide (621 mg.) of paragraph 3 is dissolved in a mixture of dimethylformamide (5 ml.), triethylamine (0.15 ml.) and cyclopentanecarboxylic acid N-hydroxy-succinimide ester (253 mg.). After three hours the reaction mixture is poured into 3% aqueous acetic acid at 0° C. and the product filtered off.

5. Cpc - Lys - Phe-Ala-Pro.—The partically protected peptide (400 mg.) of paragraph 4 is treated with cold trifluoroacetic acid (3 ml.). After 15 minutes at room temperature most of the trifluoroacetic acid is removed *in vacuo*. The oily residue is solidified by trituration with ether. The tetrapeptide trifluoroacetate is purified by column chromatography (DE–52 Cellulose) using 0.005 M and 0.1 M ammonium acetate as a linear gradient.

EXAMPLE 28

Chc-Lys-Phe-Ala-Pro

1. Z-Phe-Ala-Pro-OBzl.—The protected dipeptide prepared as described in paragraph 1 of Example 23 is treated with trifluoroacetic acid and the resulting dipeptide benzyl ester (8.7 g.) dissolved in a mixture of DMF (105 ml.), TEA (3.19 ml.) and benzyloxycarbonyl-phenylalanine-p-nitrophenyl ester (10.4 g.). After 18 hours the reaction mixture is worked up as described in paragraph 1 of Example 23.

2. Phe-Ala-Pro.—The protected tripeptide of paragraph 1 (9.9 g.) is suspended in a mixture of methanol (225 ml.), water (25 ml.) and acetic acid (10 ml.). After addition of 10% palladium on charcoal (2.5 g.), the mixture is hydrogenated at normal pressure and room temperature for five hours. The catalyst is filtered off, the filtrate concentrated to dyness *in vacuo*, and the residue purified from isopropanol-isopropyl ether.

Z
|
3. Boc-Lys-Phe-Ala-Pro.—The tripeptide of paragraph 2 (1.7 g.) is dissolved in a mixture of dimethoxyethane (25 ml.), DMF (5 ml.), TEA (0.6 ml.) and N$^\alpha$-tert.-butyloxycarbonyl-N$^\epsilon$-benzyloxycarbonyl - lysine - p-nitrophenyl ester (2.5 g.). After 17 hours at room temperature, the reaction mixture is worked up as described in paragraph 1 of Example 23.

Z
|
4. Chc-Lys-Phe-Ala-Pro.—The protected peptide of paragraph 3 is treated with trifluoroacetic acid and the partially protected tetrapeptide trifluoroacetate (1.4 g.) is dissolved in a mixture of dimethylformamide (10 ml.), triethylamine (0.28 ml.) and cyclohexane-carboxylic acid N-hydroxysuccinimido ester (800 mg.). After 18 hours at room temperature, the reaction mixture is worked up as described in paragraph 2 of Example 3.

5. Chc-Lys-Phe-Ala-Pro.—The partially protected tetrapeptide of paragraph 4 (900 mg.) treated with a 3.4 N solution of hydrogen bromide in glacial actic acid (10 ml.). After 20 minutes at room temperature, the solution is poured into ether (250 ml.). The product is purified by column chromatography.

EXAMPLE 29

Cbc-Lys-Phe-Ala-Pro
 |
 Z

1. Boc-Lys-Phe-Ala-Pro.—The tripeptide prepared according to paragraph 3 of Example 23 (3.2 g.) is dissolved in a mixture of dimethoxyethane (25 ml.), dimethylformamide (5 ml.), triethylamine (0.6 ml.) and $N^\alpha$-tert.-butyloxycarbonyl-$N^\epsilon$-benzyloxycarbonyl - lysine-p-nitrophenyl ester (2.5 g.). After 17 hours at room temperature, the reaction mixture is worked up as described in paragraph 1 of Example 23.

2. Cbc-Lys-Phe-Ala-Pro.—The protected tetrapeptide of paragraph 1 is treated with trifluoroacetic acid and the partially protected tetrapeptide trifluoroacetate (1.4 g.) dissolved in a mixture of DMF (10 ml.). TEA (0.28 ml.) and cyclobutane carboxylic acid p-nitrophenyl ester (655 mg.). After 18 hours at room temperature, the reaction mixture is worked up as described in paragraph 4 of Example 27.
 |
 Z 3. Cbc-Lys-Phe-Ala-Pro.—The partially protected peptide of paragraph 2 (1 g.) is treated with a 3.4 N solution of hydrogen bromide in glacial acetic acid (10 ml.) The product is purified by column chromatography.

EXAMPLE 30

Pyr-Trp-Pro-Arg-Pro

The title compound is prepared by the procedure of Example 8, starting from tert.-butyloxycarbonyl proline polystyrene resin, and introducing the following amino acids stepwise: nitroarginine, proline, tryptophane and pyroglutamic acid. The nitro group is removed by hydrogenolysis at the end of the synthesis.

EXAMPLE 31

Pyr-Trp-Pro-His-Pro

The title compound is prepared by the procedure described in Example 30 using $N^\alpha$-butyloxycarbonyl-$N^{Im}$-dinitrophenyl histidine (4.6 g.) in dichloromethane (45 ml.) for the introduction of the histidyl residue.

EXAMPLE 32

$N^\epsilon$-Pyr-Lys-Trp-Ala-Pro 1. tert.-Butyloxycarbonyl - Ala-Pro-benzyl ester.—Proline benzyl ester hydrochloride (16.5 g.) is dissolved in DMF (342 ml.). The solution is cooled to 0° C. and TEA (9.8 ml.) and tert.-butyloxycarbonyl-alanine p-nitrophenyl ester (20.2 g.) are added. After 21 hours at room temperature, the solvent is removed in vacuo and the residue is dissolved in ethyl acetate, washed with 20% aqueous citric acid, water, saturated sodium bicarbonate and water. The organic phase is dried over magnesium sulfate and concentrated to dryness in vacuo. The residue is dissolved in ether and the product precipitated by addition of hexane.

2. tert.-Butyloxycarbonyl-Trp-Ala-Pro - benzyl-ester.—The protected dipeptide of paragraph 1 (25 g.) is dissolved in cold trifluoroacetic acid (100 ml.). After 15 minutes at room temperature most of the trifluoroacetic acid is removed in vacuo. The oily residue is solidified by trituration with ether. This dipeptide trifluoroacetate is dissolved in a mixture of dimethylformamide (300 ml.), triethylamine (88 ml.) and tert.-butyloxycarbonyl-tryptophane 2,4,5-trichlorophenyl ester (26 g.). After 24 hours at room temperature, the reaction mixture is worked up as described in paragraph 1.

3. $N^\alpha$ - tert.-Butyloxycarbonyl-$N^\epsilon$ - benzyloxycarbonyl-Lys-Trp-Ala-Pro-benzyl ester.—The protected tripeptide of paragraph 2 is treated with trifluoroacetic acid and the resulting tripeptide benzyl ester trifluoroacetate (6.7 g.) is dissolved in a mixture of dimethylformamide (60 ml.), triethylamine (1.67 ml.) and $N^\alpha$-tert.-butyloxycarbonyl-$N^\epsilon$-benzyloxycarbonyl - lysine - p-nitrophenyl ester (5.8 g.). After 18 hours at room temperature, the reaction mixture is worked up as described in paragraph 1.

4. $N^\alpha$-tert.-Butyloxycarbonyl-Lys-Trp - Ala-Pro.—The protected tetrapeptide of paragraph 3 (0.8 g.) is dissolved in a mixture of methanol (9 ml.), water (1 ml.) and glacial acetic acid (0.2 ml.). After addition of 10% palladium on charcoal (200 mg.), the mixture is hydrogenated at normal pressure for 5 hours. The catalyst is filtered off and the filtrate concentrated to dryness in vacuo to yield the title compound.

5. $N^\epsilon$-Pyr-Lys-Trp-Ala-Pro.—The partially protected tetrapeptide of paragraph 4 is dissolved in a mixture of DMF (40 ml.), TEA (1 ml.) and pyroglutamic acid 2,4,5-trichlorophenyl ester (2.1 g.). After 17 hours at room temperature, the reaction mixture is worked up as described in paragraph 1. The partially protected pentapeptide thus obtained is treated with trifluoroacetic acid to remove the tert.-butyloxycarbonyl group.

EXAMPLE 33

Pyr-His-Trp-Ala-Pro 1-tert. - Butyloxycarbonyl-His-Trp-Ala-Pro-benzyl ester.—Trp-Ala-Pro-benzyl ester trifluoroacetate (see paragraph 3 of Example 32) is allowed to react with tert.-butyloxycarbonyl-histidine azide [see J. A. C. S., 90 4711 (1968)] and the protected tetrapeptide is isolated as described in paragraph 1 of Example 32, but eliminating the citric acid washing.

2. Pyr-His-Trp-Ala-Pro.—The protected tetrapeptide of paragraph 1 is treated with trifluoroacetic acid as in paragraph 2 of Example 32. The resulting trifluoroacetate is dissolved in a mixture of DMF (40 ml.), TEA (1 ml.) and pyroglutamic acid 2,4,5-trichlorophenyl ester (2.1 g.). After 17 hours at room temperature, the reaction mixture is worked up as described in paragraph 1 of Example 32. The protected pentapeptide ester is deprotected by catalytic hydrogenolysis.

EXAMPLE 34

Pyr-Lys-Phe-Ala-Pro

Starting with 8 g. of tert.-butyloxycarbonyl-proline polystyrene resin (containing 0.187 mmoles of proline per gram of resin) and following the procedure of Example 7, the following amino acids are introduced sequentially: Boc-Ala; Boc-Phe; α-Boc-ε-Z-Lys; and Pyr. In the latter case the solvent is a mixture of dichloromethane and dimethylformamide (2.5:1). The pentapeptide is removed from the resin with hydrobromic acid in trifluoroacetic acid. After concentration in vacuo, the free pentapeptide is isolated by precipitation with ether.

EXAMPLE 35

Pyr-Lys-Trp-Ile-Pro

Starting with 1.0 g. of t-butyloxycarbonyl-proline polystyrene resin containing 0.2 mmoles of proline per gram of resin, and following the technique described in Example 34, the following amino acid residues are introduced stepwise: isoleucine, tryptophane, lysine, and pyroglutamic acid. Tert.-butyloxycarbonyl groups are used for amino protection except for pyroglutamic acid. After the tryptophane residue is introduced in the peptide chain, all acidolytic treatments are carried out in the presence of mercaptoethanol and anisole. The removal of the peptide from the resin is carried out as in Example 10.

EXAMPLE 36

Pyr-Lys-Trp-Thr-Pro

The title compound is prepared as described for the compound of Example 35 but substituting threonine for isoleucine.

EXAMPLE 37

Pyr-Lys-Trp-Ala-Gly

Starting from butyloxycarbonyl-glycine polystyrene resin, this compound is synthesized as described in Example 8, introducing the following amino acids stepwise: alanine, tryptophane, lysine and pyroglutamic.

EXAMPLE 38

Pyr-Lys-Trp-Ala-Sar

The title compound is prepared as described for the compound of Example 37 starting from butyloxycarbonyl-sarcosine polystyrene resin.

EXAMPLE 39

Pyr-Nle-Trp-Ala-Pro

The title compound is prepared according to the procedure described in Example 8, except using tert.-butyloxycarbonyl norleucine for the introduction of the norleucyl residue prior to introduction of the pyroglutamic acid.

EXAMPLE 40

Pyr-His-Trp-Ala-Pro

The title compound is prepared according to the procedure described in Example 8, except using $N^\alpha$-butyloxycarbon-$N^{Im}$-dinitrophenyl histidine for the introduction of the histidyl residue prior to introduction of the pyroglutamic acid.

EXAMPLE 41

Pyr-Orn-Trp-Ala-Pro

Pyroglutamyl-$N^\epsilon$-benzyloxycarbonyl - Orn - Trp-Ala-Pro benzyl ester is prepared according to the procedure described in paragraph 3 of Example 32, substituting $N^\alpha$-tert.-butyloxycarbonyl-$N^\epsilon$-benzyloxycarbonyl-Orn for the lysine derivative. The Pyr residue to introduced according to the procedure described in paragraph 5 of Example 32. The free pentapeptide is obtained by catalytic hydrogenolysis.

EXAMPLE 42

Pyr-Trp-Pro-Arg-Pro-Thr-Pro-Gln-Ile-Pro-Pro

1. Gln-Ile-Pro-Pro.—The title compound is prepared starting with tert.-butyloxycarbonyl-proline polystyrene resin (8 g.) containing ca. 0.5 meq. of proline per gram and is allowed to stir overnight with dichloromethane. The dichloromethane is removed by filtration and the resin is submitted to the procedure set forth in Example 8 introducing stepwise the following amino acid residue: proline, isoleucine and glutamine, employing tert.-butyloxycarbonyl groups for amino protection in each case.

The tetrapeptide resin is then suspended in trifluoroacetic acid (100 ml.). Hydrogen bromide is bubbled through while cooling the flask in an ice-water mixture. After 35 minutes, the resin is filtered off and washed twice with trifluoroacetic acid and four times with a mixture of trifluoroacetic acid and dichloromethane (1:1). The combined filtrates are evaporated to dryness and the residue triturated with ether. The solid is filtered and dried to yield the free tetrapeptide.

2. Pyr-Trp-Pro-$\overset{NO_2}{Arg}$-Pro-$\overset{Bzl}{Thr}$-Pro.—Starting from tert.-butyloxycarbonyl-proline resin, six cycles of deprotection and coupling are carried out as described in Example 34. The amino acid derivatives used are: tert.-butyloxycarbonylproline; tert.-butyloxycarbonyl-O-benzyl-threonine; tert.-butyloxycarbonyl-proline; tert.-butyloxycarbonyl-nitroarginine; tert.-butyloxycarbonyl-proline, tert.-butyloxycarbonyl tryptophan and pyroglutamic acid. In the case of the nitroarginine, tryptophan and pyroglutamic acid residues, the solvent is a mixture of dichloromethane and dimethylformamide (2.5:1). The partially deprotected peptide (Pyr-Trp-Pro-$NO_2$-Arg-Pro-$\overset{Bzl}{Thr}$-Pro) is removed from the resin with hydrobromic acid in trifluoroacetic acid (containing anisol and mercaptoethanol).

3. Pyr-Trp-Pro-Arg-Pro-Thr-Pro-Gln-Ile-Pro-Pro.—The heptapeptide acid of paragraph 2

(Pyr-Trp-Pro-$NO_2$-Arg-Pro-$\overset{Bzl}{Thr}$-Pro)

is coupled with Gln-Ile-Pro-Pro using the mixed carboxylic carbonic anhydride procedure. The protecting groups are removed by hydrogenolysis at the end of the synthesis.

EXAMPLE 43

Pyr-Gly-Gly-Trp-Pro-Arg-Pro-Gly-Pro-Gln-Ile-Pro-Pro

Starting from 10 g. of butyloxycarbonyl-proline resin (0.2 mmole proline per gram of resin) the following amino acids are attached: proline, isoleucine, glutamine, proline, glycine, proline, nitro-arginine, tryptophane, glycine, glycine and pyroglutamic, following the technique described for Example 34. In the case of the nitroarginine, tryptophane and pyroglutamic acid residues, the solvent is a mixture of dichloromethane and dimethylformamide (2.5:1). Tert.-butyloxycarbonyl protection for the amino group is used throughout the synthesis except for Pyr. Dicyclohexylcarbodiimide is used for all the coupling steps except for glutamine where the nitrophenyl ester is used. Removal of the compound from the resin is carried out as in Example 8. The protecting groups are then removed by hydrogenolysis.

EXAMPLE 44

Pyr-Gly-Gly-Trp-Pro-Arg-Pro-Gly-Pro-Glu-Ile-Pro-Pro

The title compound is prepared by the procedure of Example 43 using γ-benzyl tert.-butyloxycarbonyl-glutamic acid instead of butyloxycarbonyl glutamine.

EXAMPLE 45

Pyr-Trp-Pro-Arg-Pro-Thr-Pro-Glu-Ile-Pro-Pro

The title compound is prepared according to the procedure described in Example 8 starting with the prolylglutamyl-isoleucyl-prolyl-proline pentapeptide prepared as described in Example 44. From the threonine residue on, the N-hydroxysuccinimide active ester is used for the coupling reactions. (The trichlorophenyl or nitrophenyl ester may be used in place of N-hydroxysuccinimide.) From the threonine residue on, trifluoroacetic acid is used for the removal of protecting groups. The arginine residue is protected with an omega nitro group and the glutamic γ-carboxyl with a benzyl ester. After removal from the resin, the protecting groups are removed by hydrogenolysis.

EXAMPLE 46

Pyr-Trp-Pro-Arg-Pro-Gly-Pro-Gln-Ile-Pro-Pro

The title compound is prepared as described for Example 43 except that pyroglutamic acid is introduced following tryptophane.

EXAMPLE 47

Pyr-Trp-Pro-Arg-Pro-Gly-Pro-Glu-Ile-Pro-Pro

The title compound is prepared as described for Example 46 using γ-benzyl-butyloxycarbonyl-glutamic acid and dicyclohexylcarbodiimide instead of glutamine.

EXAMPLE 48

Pyr-Lys-His-Ala-Pro

The title compound is prepared as described for Example 34 using $N^\alpha$-butyloxycarbonyl-$N^{Im}$-dinitrophenyl-

EXAMPLE 49

Pyr-Arg-Trp-Ala-Pro

The title compound is prepared as described for Example 8 using t-butyloxycarbonyl arginine for the introduction of the arginine residue prior to introduction of the pyroglutamic acid. After removal of the peptide from the resin, deprotection is achieved by hydrogenolysis.

EXAMPLE 50

Pyr-Trp-Pro-Arg-Pro-Gly-Pro-Glu-Ile-Pro-Pro

1. Glu-Ile-Pro-Pro.—The title compound is prepared following the procedure of part 1 of Example 42 except substituting t-butyloxy-carbonyl glutamic acid-γ-benzyl ester and dicyclohexyl-carbodiimide for t-butyloxycarbonyl-glutamine p-nitrophenyl ester.

2. Pyr-Trp-Pro-Arg-Pro-Gly-Pro.—The title compound is prepared according to the procedure of part 2 of Example 42 except substituting t-butyloxycarbonyl glycine in place of t-butyloxycarbonyl-O-benzyl threonine.

3. Pyr-Trp-Pro-Arg-Pro-Gly-Pro-Glu - Ile - Pro - Pro.— The heptapeptide of paragraph 2 is coupled with the tetrapeptide of paragraph 1 according to the procedure of part 3 of Example 42.

EXAMPLE 51

Pyr-Trp-Pro-Arg-Pro-Thr-Pro-Gln-Ile-Pro-Pro

1. Thr-Pro-Gln-Ile-Pro-Pro.—The title compound is prepared following the procedure of part 1 of Example 42 up to the stage of removing the tetrapeptide from the resin. Steps 1–5 of Example 7 are repeated and the prolyl residue introduced by coupling the tetrapeptide with tert.-butyloxycarbonyl proline, and steps 1–5 of Example 7 repeated and the N-terminal threonyl residue introduced by coupling the pentapeptide with t-butyloxycarbonyl-O-benzyl-threonine in dichloromethane. The resulting peptide is removed from the resin and obtained as the free hexapeptide as described in part 1 of Example 42.

2. Pyr-Trp-Pro-Arg-Pro.—Starting from tert.-butyloxycarbonyl proline resin polystyrene resin containing about 0.5 mmole of proline per gram of resin, the series of reactions described in Example 7 are repeated introducing sequentially tert.-butyloxycarbonyl nitroarginine, Boc-Pro, Boc-Trp, and Pyr. The pentapeptide resin is suspended in trifluoroacetic acid (100 ml.) containing mercaptoethanol (1 ml.) and anisole (2 ml.). Hydrogen bromide is bubbled through while cooling the flask in an ice-water mixture. After 35 minutes, the resin is filtered off and washed twice with trifluoroacetic acid and four times with a mixture of trifluoroacetic acid and dichloromethane (1:1), containing mercaptoethanol and anisole. The combined filtrates are evaporated to dryness and the residue triturated with ether. The solid is filtered and dried.

3. Pyr-Trp-Pro-Arg-Pro-Thr-Pro-Gln-Ile-Pro-Pro.—The hexapeptide of paragraph 1 is coupled with the pentapeptide of paragraph 2 using the mixed carboxylic carbonic anhydride procedure. The protecting groups are removed by hydrogenolysis at the end of the synthesis.

EXAMPLE 52

Pyr-Ile-Pro-Pro-Lys-Phe-Ala-Pro

Starting with tert.-butyloxycarbonyl-proline polystyrene resin (containing 0.5 mmoles of proline per gram of resin) and following the procedure of Example 7, the following amino acids are introduced sequentially: Boc-Ala, Boc-Phe, α-Boc-ε-Z-Lys, Boc-Pro, Boc-Pro, Boc-Ile, and Pyr. The peptide is removed from the resin with hydrobromic acid in trifluoroacetic acid. After concentration in vacuo, the free octapeptide is isolated by precipitation with ether.

EXAMPLE 53

Pyr-Lys-βHphe-Ala-Pro 1. 3 - L - tert. - Butyloxycarbonylamino-4-phenylbutyric acid (Boc-βHphe).—To a solution of tert.-butyloxycarbonyl-L-phenylalanine (13.2 g.) in a mixture of ether (100 ml.) and TEA (7 ml.), chilled to —5° C., ethyl chloroformate (4.8 ml.) is added. After stirring for 10 minutes at —5°, the precipitate is filtered off and the filtrate added to a solution of diazomethane (prepared from 20 g. of N-methyl-N'-nitro-N-nitrosoguanidine). The solution is stored at 5° C. overnight. The solvent is removed in vacuo and the residue crystallized from ethyl acetate-hexane.

This crystalline material (9.1 g.) is dissolved in methanol (62 ml.) and stirred at room temperature after addition of a few drops of a solution of silver benzoate (1 g.) in triethylamine (9.1 g.). When the evolution of nitrogen stops, the precipitate formed is filtered off, and the filtrate is concentrated to dryness. The residue is crystallized from hexane.

This crystalline material (5 g.) is dissolved in a mixture of methanol (50 ml.) and sodium hydroxide (34 ml.). After storing the solution for 2 hours at room temperature, N hydrochloric acid is added to neutralize the excess base, the methanol is removed in vacuo, and the desired product extracted with ethyl acetate after acidification.

2. Pyr-Lys-βHphe-Ala-Pro.—The title compound is prepared following the procedure described in Example 7 utilizing the tert.-butyloxycarbonyl derivatives of the corresponding amino acids.

EXAMPLE 54

Cpc-Trp-Pro-Gly-Pro-Lys-βHphe-Ala-Pro

The title compound is prepared as described in Example 10, utilizing the tert.-butyloxycarbonyl derivatives of the corresponding amino acids and Cpc. The preparation of Boc-βHphe is described in Example 53.

EXAMPLE 55

Pyr-Lys-Phe-Ala-Pro-Pro

The title compound is prepared as described in Example 34 but introducing Boc-Pro before Boc-Ala.

EXAMPLE 56

Pyr-Lys-Phe-Ala-Pro-Gln-Ile-Pro-Pro

The title compound is prepared according to the procedure described in Example 10, utilizing the tert.-butyloxycarbonyl derivatives of the corresponding amino acids except for Pyr. In the case of glutamine the p-nitrophenyl ester is used instead of the dicyclohexylcarbodiimide procedure for the coupling step.

EXAMPLE 57

Pyr-Lys-Trp-Pro-Arg-Pro-Gln-Ile-Pro-Pro

The title compound is prepared according to the procedure described in Example 10, utilizing the tert.-butyloxycarbonyl derivatives of the corresponding amino acids except for Pyr. In the case of glutamine the p-nitrophenyl ester is used instead of the dicyclohexylcarbodiimide procedure for the coupling step.

EXAMPLE 58

Pyr-Glu-Trp-Pro-Arg-Pro-Gln-Ile-Pro-Pro

The title compound is prepared according to the procedue described in Example 57 except introducing the glutamyl residue as the δ-benzyl ester in place of α-Boc-ε-Z-Lys. In the case of glutamine, the p-nitrophenyl ester is used instead of dicyclohexylcarbodiimide in the coupling step.

histidine for the introduction of the histidine residue in place of phenylalanine.

EXAMPLE 59

Pyr-Phe-Pro-Arg-Pro-Gln-Ile-Pro-Pro

The title compound is prepared by the procedure described in Example 10, utilizing the tert.-butyloxycarbonyl derivatives of the corresponding amino acids except for Pyr. In the case of glutamine the p-nitrophenyl ester is used instead of dicyclohexylcarbodiimide for the coupling step.

EXAMPLE 60

Pyr-Trp-Pro-Arg-Pro-Nle-Ile-Pro-Pro

The title compound is prepared by the procedure described in Example 59, but utilizing tert.-butyloxycarbonyl norleucine in place of tert.-butyloxycarbonyl isoleucine.

EXAMPLE 61

Pyr-Trp-Pro-Arg-Pro-Gln-Phe-Pro-Pro

The title compound is prepared by the procedure described in Example 59, but utilizing tert.-butyloxycarbonyl phenylalanine in place of tert.-butyloxycarbonyl isoleucine.

EXAMPLE 62

Pyr-Trp-Pro-Orn-Pro-Gln-Ile-Pro-Pro

The title compound is prepared by the procedure described in Example 10 utilizing the tert.-butyloxycarbonyl derivatives of the corresponding amino acids except for Pyr. The δ-amino group of Orn is temporarily protected with a benzyloxycarbonyl residue. In the case of the glutamine residue, the nitrophenyl ester is used in the coupling step.

EXAMPLE 63

Pyr-Lys-Phe-Ala-Ala

The title compound is prepared starting from tert.-butyloxycarbonyl-alanine polystyrene resin containing about 0.5 mmole alanine per gram and following the procedure of Example 34.

EXAMPLE 64

Pyr-Trp-Pro-Arg-Pro-Nle-Phe-Pro-Pro

The title compound is prepared following the procedure of Example 60 but utilizing tert.-butyloxycarbonyl-phenyl-alanine in place of tert.-butyloxycarbonyl-isoleucine.

EXAMPLE 65

Pyr-Trp-Pro-Arg-Pro-Nle-Ile-Ala-Pro

The title compound is prepared following the procedure of Example 60 but introducing tert.-butyloxycarbonyl alanine before isoleucine in lieu of tert.-butyloxycarbonyl proline.

EXAMPLE 66

Pyr-Trp-Pro-Arg-Pro-Nle-Phe-Ala-Pro

The title compound is prepared following the procedure of Example 65 but utilizing tert.-butyloxycarbonyl-phenylalanine in lieu of tert.-butyloxycarbonyl-isoleucine.

EXAMPLE 67

Pyr-Trp-Pro-Orn-Pro-Nle-Ile-Pro-Pro

The title compound is prepared following the procedure of Example 60 but utilizing tert. - butyloxycarbonyl ornithine in lieu of α-Boc-ω-nitro-Arg. The δ-amino group of Orn is temporarily protected with a benzyloxycarbonyl residue.

EXAMPLE 68

Pyr-Trp-Pro-Orn-Pro-Nle-Phe-Pro-Pro

The title compound is prepared following the procedure of Example 67 but utilizing tert.-butyloxycarbonyl phenylalanine in lieu of tert.-butyloxycarbonyl isoleucine.

EXAMPLE 69

Pyr-Trp-Pro-Orn-Pro-Nle-Ile-Ala-Pro

The title compound is prepared following the procedure of Example 65, but utilizing tert.-butyloxycarbonyl-δ-benzyloxycarbonyl ornithine in lieu of α-Boc-ω-nitro-Arg.

EXAMPLE 70

Pyr-Trp-Pro-Orn-Pro-Nle-Phe-Ala-Pro

The title compound is prepared following the procedure of Example 69, but utilizing tert.-butyloxycarbonyl phenylalanine in lieu of tert.-butyloxycarbonyl isoleucine.

EXAMPLE 71

Pyr-Trp-Pro-Arg-Pro-Gln-Phe-Ala-Pro

The title compound is prepared following the procedure of Example 60, but utilizing tert.-butyloxycarbonyl glutamine in lieu of tert.-butyloxycarbonyl norleucine. In the case of glutamine, the p-nitrophenyl ester is used for the coupling step.

EXAMPLE 72

Pyr-Trp-Pro-Orn-Pro-Gln-Phe-Pro-Pro

The title compound is prepared following the procedure of Example 68, but utilizing tert.-butyloxycarbonyl glutamine in lieu of tert.-butyloxycarbonyl norleucine.

EXAMPLE 73

Pyr-Trp-Pro-Orn-Pro-Gln-Ile-Ala-Pro

The title compound is prepared following the procedure of Example 72, but utilizing tert.-butyloxycarbonyl isoleucine in lieu of tert.-butyloxycarbonyl phenylalanine.

EXAMPLE 74

Pyr-Trp-Pro-Orn-Pro-Gln-Phe-Ala-Pro

The title compound is prepared following the procedure of Example 73, but utilizing tert.-butyloxycarbonyl phenylalanine in lieu of tert.-butyloxycarbonyl isoleucine.

EXAMPLE 75

Pyr-Gly-Pro-Arg-Pro-Gln-Ile-Pro-Pro

The title compound is prepared following the procedure of Example 59, but utilizing tert.-butyloxycarbonyl glycine in lieu of tert.-butyloxycarbonyl phenylalanine.

EXAMPLE 76

Cpc-Gly-Pro-Arg-Pro-Gln-Ile-Pro-Pro

The title compound is prepared following the procedure of Example 2, but utilizing tert.-butyloxycarbonyl glycine in lieu of tert.-butyloxycarbonyl phenylalanine.

EXAMPLE 77

Pyr-Leu-Pro-Arg-Pro-Gln-Ile-Pro-Pro

The title compound is prepared following the procedure of Example 75, but utilizing tert.-butyloxycarbonyl leucine in lieu of tert.-butyloxycarbonyl glycine.

EXAMPLE 78

Cpc-Leu-Pro-Arg-Pro-Gln-Ile-Pro-Pro

The title compound is prepared following the procedure of Example 76, but utilizing tert.-butyloxycarbonyl leucine in lieu of tert.-butyloxycarbonyl glycine.

EXAMPLE 79

Pyr-D-Trp-Pro-Arg-Pro-Gln-Ile-Pro-Pro

The title compound is prepared following the procedure of Example 75, but utilizing tert.-butyloxycarbonyl D-tryptophane in lieu of tert.-butyloxycarbonyl glycine.

EXAMPLE 80

Cpc-D-Trp-Pro-Arg-Pro-Gln-Ile-Pro-Pro

The title compound is prepared following the procedure of Example 78, but utilizing tert.-butyloxycarbonyl D-tryptophane in lieu of tert.-butyloxycarbonyl leucine.

EXAMPLE 81

Pyr-Trp-Pro-Arg-Pro-Gln-Ile-Pro-Pro

1. Pro-Gln-Ile-Pro-Pro.—The title compound is prepared following the procedure of part 1 of Example 42 up to the step of removing the tetrapeptide from the resin. The N-terminal prolyl residue is then introduced by shaking the tetrapeptide resin with a solution of tert.-butyloxycarbonyl proline (2.57 g.) in dichloromethane (56 ml.) for 20 minutes. A solution of dicyclohexylcarbodiimide (2.5 g.) in dichloromethane is added and the shaking continued for 3 hours. The resulting peptide is removed from the resin and obtained as the free pentapeptide as described in paragraph 2 of part 1 of Example 42.

2. Arg-Pro-Gln-Ile-Pro-Pro. — The pentapeptide of paragraph 1 is coupled with benzyloxycarbonyl nitroarginine 2,4-dinitrophenyl ester using the procedure of paragraph 7 of Example 1 but eliminating the washing with ammonia. The protected hexapeptide is subjected to hydrogenolysis to yield the title hexapeptide.

3. Pyr-Trp-Pro-Arg-Pro-Gln-Ile-Pro-Pro. — The hexapeptide of paragraph 2 is coupled to the tripeptide Pyr-Trp-Pro following the procedure of paragraph 9 of Example 1 to yield the title compound.

EXAMPLE 82

Pyr-Trp-Pro-Arg-Pro-Gln-Ile-Pro-Pro

The title compound is prepared starting from tert.-butyloxycarbonyl proline polystyrene resin containing 0.5 mmoles of proline per gram of resin and following the procedure of Example 10 introducing sequentially Boc-Pro, Boc-Ile, Boc-Glu p-nitrophenyl ester, Boc-Pro, α-Boc-ω-nitro-Arg, Boc-Pro, Boc-Trp, and Pyr.

EXAMPLE 83

Pyr-Trp-Pro-Arg-Pro-Thr-Pro-Gln-Ile-Pro-Pro

1. Pro-Thr-Pro-Gln-Ile-Pro-Pro.—The title compound is prepared following the procedure of paragraph 1 of Example 51 up to the stage of removing the hexapeptide from the resin. The N-terminal prolyl residue is then introduced following the procedure of paragraph 1 of Example 81. The resulting peptide is removed from the resin and obtained as the free heptapeptide following the procedure of paragraph 2 of part 1 of Example 42.

2. Arg-Pro-Thr-Pro-Gln-Ile-Pro-Pro.—The title compound is prepared by coupling benzoyloxycarbonyl nitroarginine 2,4-dinitrophenyl ester to the heptapeptide of paragraph 1 by the procedure of paragraph 2 of Example 81.

3. Pyr-Trp-Pro-Arg-Pro - Thr - Pro-Gln-Ile-Pro-Pro.— The title compound is prepared by coupling the octapeptide of paragraph 2 to the tripeptide Pyr-Trp-Pro following the procedure of paragraph 9 of Example 1.

EXAMPLE 84

Pyr-Trp-Pro-Arg-Pro-Thr-Pro-Gln-Ile-Pro-Pro

1. Pro-Arg-Pro-Thr-Pro-Gln - Ile - Pro-Pro.—The title compound is prepared following the procedure of Example 10 introducing the following protected amino acids sequentially: Boc-Pro, Boc-Ile, Boc-Gln, Boc-Pre, Boc-O-Bzl-Thr, Boc-Pro, α-Boc-ω-nitro-Arg and Boc-Pro. The peptide is removed from the resin as described in paragraph 9 of Example 7 to yield the free nonapeptide. The remaining protecting groups are then removed by hydrogenolysis.

2. Trp-Pro-Arg-Pro-Thr - Pro - Gln-Ile-Pro-Pro.—The title compound is prepared by coupling tert.-butyloxycarbonyl tryptophan 2,4,5 - trichlorophenyl ester to the nonapeptide of paragraph 1 according to the procedure of paragraph 2 of Example 1.

3. Pyr-Trp-Pro-Arg-Pro - Thr - Pro-Gln-Ile-Pro-Pro.— The title compound is prepared by coupling pyroglutamic acid 2,4,5 - trichlorophenyl ester to the decapeptide of paragraph 2 following the procedure of paragraph 2 of Example 1.

EXAMPLE 85

Pyr-Trp-Pro-Arg-Pro-Thr-Pro-Glu-Ile-Pro-Pro

1. Glu-Ile-Pro-Pro.—The title compound is prepared following the procedure of paragraph 1 of Example 42 except substituting tert.-butyloxycarbonyl glutamic acid-γ-benzyl ester and dicyclohexylcarbodiimide for Boc-Gln.

2. Pyr-Trp-Pro-Arg-Pro - Thr - Pro-Glu-Ile-Pro-Pro.— The title compound is prepared by coupling the tetrapeptide of paragraph 1 to the heptapeptide acid prepared as described in paragraph 2 of Example 42 following the procedure of paragraph 3 of Example 42.

EXAMPLE 86

Pyr-Trp-Pro-Arg-Pro-Gly-Pro-Glu-Ile-Pro-Pro

1. Pyr-Trp-Pro-$NO_2$-Arg-Pro-Gly-Pro.—The title compound is prepared following the procedure of part 2 of Example 42, but substituting Boc-Gly for tert.-butyloxycarbonyl-O-benzyl-threonine.

2. Pyr-Trp-Pro-Arg - Pro - Gly-Pro-Glu-Ile-Pro-Pro.— The title compound is prepared by coupling the tetrapeptide of paragraph 1 of Example 85 to the heptapeptide acid of paragraph 1 following the procedure of part 3 of Example 42.

EXAMPLE 87

Pyr-Trp-Pro-Gly-Pro-Glu-Ile-Pro-Pro

1. Gly-Pro-Glu-Ile-Pro-Pro.—The title compound is prepared following the procedure of paragraph 1 of Example 51, but substituting tert.-butyloxycarbonyl glycine in lieu of tert.-butyloxycarbonyl-O-benzyl threonine and Boc-Glu in lieu of Boc-Gln.

2. Pyr-Trp-Pro-Gly-Pro - Glu - Ile-Pro-Pro.—The title compound is prepared by coupling the tripeptide Pyr-Trp-Pro to the hexapeptide of paragraph 1 following the procedure of paragraph 9 of Example 1.

EXAMPLE 88

Pyr-Trp-Pro-Gly-Pro-Gln-Ile-Pro-Pro

1. Pro-Gly-Pro-Gln-Ile-Pro-Pro.—The title compound is prepared following the procedure of paragraph 1 of Example 83, but substituting tert.-butyloxycarbonyl glycine for tert.-butyloxycarbonyl-O-benzyl threonine.

2. Trp-Pro-Gly-Pro-Gln-Ile-Pro-Pro.—The title compound is prepared by coupling tert.-butyloxycarbonyl tryptophan 2,4,5-trichlorophenyl ester to the heptapeptide of paragraph 1 according to the procedure of paragraph 2 of Example 1.

3. Pyr-Trp-Pro-Gly-Pro - Gln - Ile-Pro-Pro.—The title compound is prepared by coupling pyroglutamic acid 2,4,5-trichlorophenyl ester to the octapeptide of paragraph 2 following the procedure of paragraph 2 of Example 1.

EXAMPLE 89

Pyr-Trp-Pro-Arg-Pro-Gly-Pro-Gln-Ile-Pro-Pro

1. Arg-Pro-Gly-Pro-Gln-Ile-Pro-Pro.—The title compound is prepared following the procedure of paragraph 2 of Example 83, but substituting tert.-butyloxycarbonyl glycine in lieu of tert. - butyloxycarbonyl - O - benzyl threonine.

2. Pyr-Trp-Pro-Arg - Pro - Gly-Pro-Gln-Ile-Pro-Pro.— The title compound is prepared by coupling the octapeptide of paragraph 1 to the tripeptide Pyr-Trp-Pro following the procedure of paragraph 9 of Example 1.

EXAMPLE 90

Pyr-Trp-Pro-Arg-Pro-Gly-Pro-Gln-Ile-Pro-Pro

1. Pro-Arg-Pro-Gly-Pro-Gln - Ile - Pro-Pro.—The title compound is prepared according to the procedure of paragraph 1 of Example 84, but substituting tert.-butyloxycarbonyl glycine in lieu of tert.-butyloxycarbonyl-O-benzyl threonine.

2. Trp-Pro-Arg - Pro - Gly-Pro-Gln-Ile-Pro-Pro.—The title compound is prepared by coupling tert.-butyloxycarbonyl tryptophan 2,4,5 - trichlorophenyl ester to the nonapeptide of paragraph 1 according to the procedure of paragraph 2 of Example 1.

3. Pyr-Trp-Pro-Arg - Pro - Gly-Pro-Gln-Ile-Pro-Pro.— The title compound is prepared by coupling pyroglutamic acid 2,4,5-trichlorophenyl ester to the decapeptide of paragraph 2 following the procedure of paragraph 2 of Example 1.

EXAMPLE 91

Pyr-Asn-Trp-Pro-His-Pro-Gln-Ile-Pro-Pro

The title compound is prepared following the procedure of Example 57, but utilizing $N^\alpha$-tert.-butyloxycarbonyl-$N^{Im}$ - dinitrophenyl histidine (4.6 g.) in DCM (45 ml.) in lieu of tert.-butyloxycarbonyl - $\omega$ - nitroarginine, and utilizing tert.-butyloxycarbonyl asparagine p-nitrophenyl ester (1.42 g.) in a mixture of DMF (7 ml.) and DCM (21 ml.) in lieu of $N^\alpha$-tert.-butyloxycarbonyl-$N^\epsilon$-benzyloxycarbonyl lysine. The $N^{Im}$-dinitrophenyl protecting group is removed by treatment with mercaptoethanol at pH 8.

EXAMPLE 92

Pyr-Ser-Trp-Pro-Gly-Pro-Asn-Ile-Pro-Pro

The title compound is prepared following the procedure of Example 91 but (1) introducing tert.-butyloxycarbonyl-asparagine p-nitrophenyl ester (3.54 g.) in a mixture of DMF (15 ml.) and DCM (41 ml.) in lieu of glutamine, (2) introducing tert.-butyloxycarbonyl glycine in lieu of $N^\alpha$-tert.-butyloxycarbonyl - $N^{Im}$ - dinitrophenyl histidine, and (3) using tert.-butyloxycarbonyl-O-benzyl-serine and dicyclohexylcarbodiimide to introduce serine in lieu of tert.-butyloxycarbonyl-asparagine p-nitrophenyl ester.

EXAMPLE 93

Pry-Ser-Trp-Pro-His-Pro-Gln-Ile-Pro-Pro

The title compound is prepared as described for the compound of Example 91, except using tert.-butyloxycarbonyl-O-benzyl-serine and dicyclohexylcarbodiimide to introduce the seryl residue in lieu of tert.-butyloxycarbonyl-asparagine p-nitrophenyl ester.

EXAMPLE 94

Pyr-Nle-Trp-Pro-His-Pro-Gln-Ile-Pro-Pro

The title compound is prepared as described for the compound of Example 91, except using t-butyloxycarbonyl-norleucine and dicyclohexylcarbodiimide to introduce the norleucyl residue in lieu of tert.-butyloxycarbonyl-asparagine p-nitrophenyl ester.

EXAMPLE 95

Pyr-Asn-Trp-Pro-Arg-Pro-Gln-Ile-Pro-Pro

The title compound is prepared as described for the compound of Example 91, except using t-butyloxycarbonyl-nitroarginine for the introduction of the arginyl residue in place of $N^\alpha$-t-butyloxycarbonyl-$N^{Im}$-dinitrophenyl histidine. The nitro protecting group of the nitroarginine residue is removed by hydrogenolysis at the end of the synthesis.

EXAMPLE 96

Pyr-Ser-Trp-Pro-Lys-Pro-Gln-Ile-Pro-Pro

The title compound is prepared as described for the compound of Example 93, except using $N^\alpha$-t-butyloxycarbonyl-$N^\epsilon$-trifluoroacetyl lysine for the introduction of the lysyl residue in place of $N^\alpha$-t-butyloxycarbonyl-$N^{Im}$-dinitrophenyl histidine. The trifluoroacetyl protecting group is removed by treatment with piperidine at the end of the synthesis.

EXAMPLE 97

Pyr-Asn-Trp-Pro-His-Pro-Gln-Ile-Pro-Pro

1. Pyr-Asn-Trp-Pro-His-Pro.—Starting from t - butyloxycarbonyl prolyl resin, the title compound is prepared by following the procedure of Example 91, but omitting those operations required to introduce the sequence Gln-Ile-Pro-Pro.

2. Pyr-Asn-Trp-Pro-His-Pro-Gln-Ile - Pro - Pro.—The title compound is prepared by coupling the tetrapeptide Gln-Ile-Pro-Pro prepared as described in part 1 of Example 42 to the hexapeptide of paragraph 1 according to the procedure of part 3 of Example 42.

EXAMPLE 98

Pyr-Ser-Trp-Pro-His-Pro-Gln-Ile-Pro-Pro

1. Pyr-Ser-Trp-Pro-His-Pro.—The title compound is prepared as described for the compound of paragraph 1 of Example 97 except using t-butyloxycarbonyl-O-benzyl serine and dicyclohexylcarbodiimide to introduce the seryl residue in lieu of tert.-butyloxycarbonyl-asparagine p-nitrophenyl ester.

2. Pyr-Ser-Trp-Pro-His-Pro-Gln - Ile - Pro - Pro.—The title compound is prepared by coupling the tetrapeptide Gln-Ile-Pro-Pro to the hexapeptide of paragraph 1 according to the procedure of part 3 of Example 42.

EXAMPLE 99

Pyr-Ser-Trp-Pro-Arg-Pro-Gln-Ile-Pro-Pro $$\overset{\displaystyle NO_2}{|}$$

1. Pyr-Ser-Trp-Pro-Arg-Pro.—The title compound is prepared as described for the compound of paragraph 1 of Example 98, except using t-butyloxycarbonyl-nitroarginine to introduce the argenyl residue in place of $N^\alpha$-t-butyloxycarbonyl-$N^{Im}$-dinitrophenyl histidine.

2. Pyr-Ser-Trp-Pro-Arg-Pro-Gln - Ile - Pro - Pro.—The title compound is prepared by coupling the tetrapeptide Gln-Ile-Pro-Pro to the hexapeptide of paragraph 1 according to the procedure of part 3 of Example 42. The nitro protecting group is removed by hydrogenolysis at the end of the synthesis.

EXAMPLE 100

Pyr-Nle-Trp-Pro-Lys-Pro-Gln-Ile-Pro-Pro $$\overset{\displaystyle Tfa}{|}$$

1. Pyr-Nle-Trp-Pro-Lys-Pro.—The title compound is prepared as described for the compound of paragraph 1 of Example 97, except using $N^\alpha$-t-butyloxycarbonyl-$N^\epsilon$-trifluoroacetyl lysine to introduce the lysyl residue in place of $N^\alpha$-t-butyloxycarbonyl-$N^{Im}$-dinitrophenyl histidine, and using t-butyloxycarbonyl-norleucine to introduce the norleucyl residue in lieu of tert.-butyloxycarbonyl asparagine p-nitrophenyl ester.

2. Pyr-Nle-Trp-Pro-Lys-Pro-Gln - Ile - Pro - Pro.—The title compound is prepared by coupling the tetrapeptide Gln-Ile-Pro-Pro to the hexapeptide of paragraph 1 according to the procedure of part 3 of Example 42. The trifluoroacetyl group is removed by treatment with piperidine at the end of the synthesis.

EXAMPLE 101

Pyr-Ser-Trp-Pro-Gly-Pro-Gln-Ile-Pro-Pro

1. Pyr-Ser-Trp-Pro-Gly-Pro.—The title compound is prepared as described for the compound of paragraph 1 of Example 98, except using t-butyloxycarbonyl glycine to introduce the glycine residue in lieu of $N^\alpha$-t-butyloxycarbonyl-$N^{Im}$-dinitrophenyl histidine.

2. Pyr-Ser-Trp-Pro-Gly-Pro-Gln-Ile-Pro-Pro.—The title compound is prepared by coupling the hexapeptide acid of paragraph 1, Pyr-Ser-Trp-Pro-Gly-Pro, to the tetrapeptide, Gln-Ile-Pro-Pro, prepared according to the procedure set forth in part 1 of Example 42, using the mixed carboxylic carbonic anhydride procedure to effect the coupling.

EXAMPLE 102

Pyr-Trp-Pro-Arg-Pro-Gln-Ile-Pro-Pro

The title compound is prepared as described for the compound of Example 91, except using t-butyloxycarbonyl-nitroarginine in place of $N^\alpha$-t-butyloxycarbonyl-$N^{Im}$-dinitrophenyl histidine, and omitting those steps required for incorporation of the asparaginyl residue. The removal of the nitro group from the nitro nonapeptide is achieved by hydrogenolysis at the end of the synthesis.

EXAMPLE 103

Pyr-Asn-Trp-Pro-Arg-Pro-Asn-Ile-Pro-Pro

The title compound is prepared as described for the compound of Example 95 except substituting tert.-butyloxycarbonyl asparagine p-nitrophenyl ester for tert.-butyloxycarbonyl glutamine p-nitrophenyl ester to introduce the asparaginyl residue in lieu of the glutaminyl residue.

EXAMPLE 104

Pyr-Ser-Trp-Pro-Arg-Pro-Asn-Ile-Pro-Pro

The title compound is prepared as described for the compound of Example 92 except using tert.-butyloxycarbonylnitroarginine to introduce the arginyl residue in lieu of tert.-butyloxycarbonyl glycine. The nitro protecting group of the nitroarginine residue is removed by hydrogenolysis at the end of the synthesis.

EXAMPLE 105

Pyr-Nle-Trp-Pro-Arg-Pro-Asn-Ile-Pro-Pro

The title compound is prepared as described for the compound of Example 104, except using t-butyloxycarbonylnorleucine and dicyclohexylcarbodiimide to introduce the norleucyl residue in lieu of the serine residue.

EXAMPLE 106

Pyr-Trp-Pro-Arg-Pro-Asn-Ile-Pro-Pro

The title compound is prepared as described for the compound of Example 104, except eliminating the procedures required to introduce the seryl residue.

EXAMPLE 107

Pyr-Asn-Trp-Pro-His-Pro-Asn-Ile-Pro-Pro

The title compound is prepared following the procedure of Example 91 except introducing asparagine in place of glutamine according to the procedure of Example 92.

EXAMPLE 108

Pyr-Ser-Trp-Pro-His-Pro-Asn-Ile-Pro-Pro

The title compound is prepared following the procedure of Example 92, except using $N^\alpha$-tert.-butyloxycarbonyl-$N^{Im}$-dinitrophenyl histidine in lieu of tert.-butyloxycarbonyl glycine.

EXAMPLE 109

Pyr-Nle-Trp-Pro-His-Pro-Asn-Ile-Pro-Pro

The title compound is prepared following the procedure of Example 94 except substituting tert.-butyloxycarbonyl asparagine p-nitrophenyl ester for tert.butyloxycarbonyl glutamine p-nitrophenyl ester to introduce the asparaginyl residue in lieu of the glutaminyl residue.

EXAMPLE 110

Pyr-Trp-Pro-His-Pro-Asn-Ile-Pro-Pro

The title compound is prepared following the procedure of Example 107, except eliminating the steps required to insert the asparaginyl moiety after introduction of the tryptophyl moiety.

EXAMPLE 111

Pyr-Asn-Trp-Pro-Lys-Pro-Asn-Ile-Pro-Pro

The title compound is prepared following the procedure of Example 107, except using $N^\alpha$-t-butyloxycarbonyl-$N^\epsilon$-trifluoroacetyl lysine for the introduction of lysine in place of $N^\alpha$-t-butyloxycarbonyl-$N^{Im}$-dinitrophenyl histidine. The trifluoroacetyl group is removed by treatment with piperidine at the end of the synthesis.

EXAMPLE 112

Pyr-Ser-Trp-Pro-Lys-Pro-Asn-Ile-Pro-Pro

The title compound is prepared following the procedure of Example 96, except introducing asparagine in place of glutamine as described in Example 103.

EXAMPLE 113

Pyr-Nle-Trp-Pro-Lys-Pro-Asn-Ile-Pro-Pro

The title compound is prepared following the procedure of Example 111, except using tert.-butyloxycarbonylnorleucine and dicyclohexylcarbodiimide to introduce the norleucyl residue after the tryptophyl residue in lieu of the asparaginyl residue.

EXAMPLE 114

Pyr-Trp-Pro-Lys-Pro-Asn-Ile-Pro-Pro

The title compound is prepared following the procedure of Example 113, except eliminating those steps required to introduce the norleucyl residue after introduction of the tryptophyl residue.

EXAMPLE 115

Pyr-Asn-Trp-Pro-Gly-Pro-Asn-Ile-Pro-Pro

The title compound is prepared following the procedure of Example 92, except using tert.-butyloxycarbonyl-asparagine p-nitrophenyl ester to introduce the asparaginyl residue in lieu of the seryl residue.

EXAMPLE 116

Pyr-Nle-Trp-Pro-Gly-Pro-Asn-Ile-Pro-Pro

The title compound is prepared following the procedure of Example 92, except using t-butyloxycarbonylnorleucine and dicyclohexylcarbodiimide to introduce the norleucyl residue in lieu of t-butyloxycarbonyl-O-benzyl serine and dicyclohexylcarbodiimide.

EXAMPLE 117

Pyr-Trp-Pro-Gly-Pro-Asn-Ile-Pro-Pro

The title compound is prepared following the procedure of Example 114 except using t-butyloxycarbonyl glycine in place of $N^\alpha$ - t - butyloxycarbonyl - $N^\epsilon$-trifluoroacetyl lysine.

EXAMPLE 118

Pyr-Ser-Trp-Pro-Arg-Pro-Gln-Ile-Pro-Pro

The title compound is prepared following the procedure of Example 93, except using t-butyloxycarbonyl nitroarginine for the introduction of the arginyl residue in lieu of $N^\alpha$-t-butyloxycarbonyl-$N^{Im}$-dinitrophenyl histidine. The nitro protecting group of the nitroarginine residue is removed by hydrogenolysis at the end of the synthesis.

EXAMPLE 119

Pyr-Nle-Trp-Pro-Arg-Pro-Gln-Ile-Pro-Pro

The title compound is prepared following the procedure of Example 94, except using t-butyloxycarbonyl nitroarginine for the introduction of the arginyl residue in lieu of $N^\alpha$-t-butyloxycarbonyl-$N^{Im}$-dinitrophenyl histidine. The nitro protecting group of the nitroarginine residue is removed by hydrogenolysis at the end of the synthesis.

EXAMPLE 120

Pyr-Trp-Pro-His-Pro-Gln-Ile-Pro-Pro

The title compound is prepared following the procedure of Example 102, except using $N^\alpha$-t-butyloxycarbonyl-$N^{Im}$-dinitrophenyl histidine in lieu of t-butyloxycarbonyl nitroarginine.

EXAMPLE 121

Pyr-Asn-Trp-Pro-Lys-Pro-Gln-Ile-Pro-Pro

The title compound is prepared following the procedure of Example 91, except using $N^\alpha$-t-butyloxycarbonyl-$N^\epsilon$-trifluoroacetyl lysine for the introduction of the lysyl residue in place of $N^\alpha$-t-butyloxycarbonyl-$N^{Im}$-dinitrophenyl histidine. The trifluoroacetyl group is removed by treatment with piperidine at the end of the synthesis.

EXAMPLE 122

Pyr-Nle-Trp-Pro-Lys-Pro-Gln-Ile-Pro-Pro-

The title compound is prepared following the procedure of Example 94, except using $N^\alpha$-t-butyloxycarbonyl-$N^\epsilon$-trifluoroacetyl lysine for the introduction of the lysyl residue in place of $N^\alpha$-t-butyloxycarbonyl-$N^{Im}$-dinitrophenyl histidine. The trifluoroacetyl group is removed by treatment with piperidine at the end of the synthesis.

EXAMPLE 123

Pyr-Trp-Pro-Lys-Pro-Gln-Ile-Pro-Pro

The title compound is prepared following the procedure of Example 102 except using $N^\alpha$-t-butyloxycarbonyl-$N^\epsilon$-trifluoroacetyl lysine for the introduction of the lysyl residue in place of t-butyloxycarbonyl nitroarginine. The trifluoroacetyl group is removed by treatment with piperidine at the end of the synthesis.

EXAMPLE 124

Pyr-Asn-Trp-Pro-Gly-Pro-Gln-Ile-Pro-Pro

The title compound is prepared following the procedure of Example 95, except using t-butyloxycarbonyl glycine in place of t-butyloxycarbonyl nitroarginine.

EXAMPLE 125

Pyr-Ser-Trp-Pro-Gly-Pro-Gln-Ile-Pro-Pro

The title compound is prepared following the procedure of Example 93, except using t-butyloxycarbonyl glycine in lieu of $N^\alpha$-t-butyloxycarbonyl-$N^{Im}$-dinitrophenyl histidine.

EXAMPLE 126

Pyr-Nle-Trp-Gly-Pro-Gln-Ile-Pro-Pro

The title compound is prepared following the procedure of Example 94, except using t-butyloxycarbonyl glycine in lieu of $N^\alpha$-t-butyloxycarbonyl-$N^{Im}$-dinitrophenyl histidine.

EXAMPLE 127

Pyr-Trp-Pro-Gly-Pro-Gln-Ile-Pro-Pro

The title compound is prepared following the procedure of Example 102, except using t-butyloxycarbonyl glycine in place of t-butyloxycarbonyl nitroarginine.

EXAMPLE 128

Pyr-Asn-Trp-Pro-Arg-Pro

The title compound is prepared following the procedure of Example 91, except using t-butyloxycarbonyl nitroarginine for the introduction of the arginyl residue in place of $N^\alpha$-t-butyloxycarbonyl-$N^{Im}$-dinitrophenyl histidine, and eliminating those steps required for introduction of the Gln-Ile-Pro-Pro moiety. The nitro protecting group of the nitroarginine residue is removed by hydrogenolysis at the end of the synthesis.

EXAMPLE 129

Pyr-Nle-Trp-Pro-Arg-Pro

The title compound is prepared following the procedure of paragraph 1 of Example 100 except using t-butyloxycarbonyl nitroarginine for the introduction of the arginyl residue in place of $N^\alpha$-t-butyloxycarbonyl-$N^\epsilon$-trifluoroacetyl lysine. The nitro protecting group of the nitroarginine residue is removed by hydrogenolysis at the end of the synthesis.

EXAMPLE 130

Pyr-Nle-Trp-Pro-His-Pro

The title compound is prepared following the procedure of paragraph 1 of Example 97, except using t-butyloxycarbonyl norleucine and dicyclohexylcarbodiimide to introduce the norleucyl residue in lieu of the asparaginyl residue.

EXAMPLE 131

Pyr-Asn-Trp-Pro-Lys-Pro

The title compound is prepared following the procedure of Example 97, except using $N^\alpha$-t-butyloxycarbonyl-$N^\epsilon$-trifluoroacetyl lysine for the introduction of the lysyl residue in place of $N^\alpha$-t-butyloxycarbonyl-$N^{Im}$-dinitrophenyl histidine. The trifluoroacetyl group is removed by treatment with piperidine at the end of the synthesis.

EXAMPLE 132

Pyr-Ser-Trp-Pro-Lys-Pro

The title compound is prepared following the procedure of paragraph 1 of Example 98, except using $N^\alpha$-t-butyloxycarbonyl-$N^\epsilon$-trifluoroacetyl lysine for the introduction of the lysyl residue in place of $N^\alpha$-t-butyloxycarbonyl-$N^{Im}$-dinitrophenyl histidine. The trifluoroacetyl group is removed by treatment with piperidine at the end of the synthesis.

EXAMPLE 133

Pyr-Trp-Pro-Lys-Pro

The title compound is prepared following the procedure of paragraph 1 of Example 30, except using $N^\alpha$-t-butyloxycarbonyl-$N^\epsilon$-trifluoroacetyl lysine for the introduction of the lysyl residue in place of t-butyloxycarbonyl nitroarginine. The trifluoroacetyl group is removed by treatment with piperidine at the end of the synthesis.

EXAMPLE 134

Pyr-Asn-Trp-Pro-Gly-Pro

The title compound is prepared following the procedure of paragraph 1 of Example 97, except using t-butyloxycarbonyl glycine in lieu of $N^\alpha$-t-butyloxycarbonyl-$N^{Im}$-dinitrophenyl histidine.

EXAMPLE 135

Pyr-Nle-Trp-Pro-Gly-Pro

The title compound is prepared following the procedure of paragraph 1 of Example 100, except using t-butyloxycarbonyl glycine in place of $N^\alpha$-t-butyloxycarbonyl-$N^\epsilon$-trifluoroacetyl lysine.

EXAMPLE 136

Pyr-Trp-Pro-Gly-Pro

The title compound is prepared following the procedure of paragraph 2 of Example 51, except using t-butyloxycarbonyl glycine in place of t-butyloxycarbonyl nitroarginine.

EXAMPLE 137

Pyr-Trp-Pro-Arg-Pro-Asn-Ile-Pro-Pro

1. Asn-Ile-Pro-Pro.—The title compound is prepared following the procedure of part 1 of Example 42 except substituting t-butyloxycarbonyl asparagine p-nitrophenyl ester to introduce the asparaginyl residue in lieu of the glutaminyl residue.

2. Pyr - Trp - Pro-Arg-Pro-Asn-Ile-Pro-Pro.—The title compound is prepared by coupling the pentapeptide acid Pyr-Trp-Pro-Arg-Pro (prepared as described in Example 30) to the tetrapeptide of paragraph 1 using the mixed carboxylic carbonic anhydride procedure.

EXAMPLE 138

Pyr-Trp-Pro-Arg-Pro-Asn-Ile-Pro-Pro

1. Pro-Asn-Ile-Pro-Pro.—The title compound is prepared following the procedure of paragraph 1 of Example 81 except substituting t-butyloxycarbonyl asparagine p-nitrophenyl ester to introduce the asparaginyl residue in lieu of the glutaminyl residue.

2. Arg-Pro-Asn-Ile-Pro-Pro.—The pentapeptide of paragraph 1 is coupled with t-butyloxycarbonyl nitroarginine 2,4-dinitrophenyl ester using the procedure of paragraph 7 of Example 1 but eliminating the washing with ammonia. The protected hexapeptide is subjected to hydrogenolysis to yield the title compound.

3. Pyr - Trp - Pro - Arg - Pro - Asn - Ile - Pro - Pro.— The hexapeptide of paragraph 2 is coupled to the tripeptide Pyr-Trp-Pro following the procedure of paragraph 9 of Example 1 to yield the title compound.

EXAMPLE 139

Pyr-Trp-Pro-His-Pro-Asn-Ile-Pro-Pro

1. His-Pro-Asn-Ile-Pro-Pro.—The title compound is prepared by coupling $N^\alpha$-t-butyloxycarbonyl-$N^{Im}$-dinitrophenyl histidine to the pentapeptide prepared as described in paragraph 1 of Example 138.

2. Pyr - Trp - Pro - His - Pro - Asn - Ile - Pro - Pro.— The hexapeptide of paragraph 1 is coupled to the tripeptide Pyr-Trp-Pro following the procedure of paragraph 9 of Example 1 to yield the title compound.

EXAMPLE 140

Pyr-Trp-Pro-Lys-Pro-Asn-Ile-Pro-Pro

1. Lys-Pro-Asn-Ile-Pro-Pro.—The title compound is prepared following the procedure of paragraph 1 of Example 139, but substituting $N^\alpha$-t-butyloxycarbonyl-$N^\epsilon$-trifluoroacetyl lysine in lieu of $N^\alpha$-t-butyloxycarbonyl-$N^{Im}$-dinitrophenyl histidine.

2. Pyr - Trp - Pro - Lys - Pro - Asn - Ile - Pro - Pro.— The hexapeptide of paragraph 1 is coupled to the tripeptide Pyr-Trp-Pro following the production of paragraph 9 of Example 1 to yield the title compound.

EXAMPLE 141

Pyr-Trp-Pro-Gly-Pro-Asn-Ile-Pro-Pro

1. Gly-Pro-Asn-Ile-Pro-Pro.—The title compound is prepared following the procedure of paragraph 1 of Example 139 but substituting t-butyloxycarbonyl glycine for $N^\alpha$-t-butyloxycarbonyl-$N^{Im}$-dinitrophenyl histidine.

2. Pyr - Trp - Pro - Gly - Pro - Asn - Ile - Pro - Pro.— The hexapeptide of paragraph 1 is coupled to the tripeptide Pyr-Trp-Pro following the procedure of paragraph 9 of Example 1 to yield the title compound.

EXAMPLE 142

Pyr-Trp-Pro-His-Pro-Gln-Ile-Pro-Pro

1. His-Pro-Gln-Ile-Pro-Pro.—The title compound is prepared following the procedure of paragraph 2 of Example 81, but substituting $N^\alpha$-t-butyloxycarbonyl-$N^{Im}$-dinitrophenyl histidine for t-butyloxycarbonyl nitroarginine.

2. Pyr-Trp-Pro-His-Pro-Gln-Ile-Pro-Pro. — The hexapeptide of paragraph 1 is coupled to the tripeptide Pyr-Trp-Pro following the procedure of paragraph 9 of Example 1 to yield the title compound.

EXAMPLE 143

Pyr-Trp-Pro-Gly-Pro-Gln-Ile-Pro-Pro

1. Gly-Pro-Gln-Ile-Pro-Pro. — The title compound is prepared following the procedure of paragraph 2 of Example 81, but substituting t-butyloxycarbonyl glycine for t-butyloxycarbonyl nitroarginine.

2. Pyr-Trp-Pro-Gly-Pro-Gln-Ile-Pro-Pro. — The hexapeptide of paragraph 1 is coupled to the tripeptide Pyr-Trp-Pro following the procedure of paragraph 9 of Example 1 to yield the title compound.

EXAMPLE 144

Cbc-Trp-Pro-Arg-Pro-Gln-Ile-Pro-Pro

The title compound is prepared following the procedure of Example 3, except substituting cyclobutane carboxylic acid hydroxysuccinimido ester for cyclopentane carboxylic acid hydroxysuccinimido ester.

EXAMPLE 145

Cbc-Tyr-Pro-Arg-Pro-Gln-Ile-Pro-Pro

The title compound is prepared following the procedure of Example 6, except substituting cyclobutane carboxylic acid hydroxysuccinimido ester for cyclopentane carboxylic acid hydroxysuccinimido ester.

EXAMPLE 146

Bzl
|
Cbc-Tyr-Pro-Arg-Pro-Gln-Ile-Pro-Pro

The title compound is prepared following the procedure of Example 5, except substituting cyclobutane carboxylic acid hydroxysuccinimido ester for cyclopentane carboxylic acid hydroxysuccinimido ester.

EXAMPLE 147

Cbc-Phe-Pro-Arg-Pro-Gln-Ile-Pro-Pro

The title compound is prepared following the procedure of Example 2, except substituting cyclobutane carboxylic acid hydroxysuccinimido ester for cyclopentane carboxylic acid hydroxysuccinimido ester.

EXAMPLE 148

Cbc-Gly-Pro-Arg-Pro-Gln-Ile-Pro-Pro

The title compound is prepared following the procedure of Example 76, except substituting cyclobutane carboxylic acid hydroxysuccinimido ester for cyclopentane carboxylic acid hydroxysuccinimido ester.

EXAMPLE 149

Cbc-Leu-Pro-Arg-Pro-Gln-Ile-Pro-Pro

The title compound is prepared following the procedure of Example 78, except substituting cyclobutane carboxylic acid hydroxysuccinimido ester for cyclopentane carboxylic acid hydroxysuccinimido ester.

EXAMPLE 150

Cbc-D-Trp-Pro-Arg-Pro-Gln-Ile-Pro-Pro

The title compound is prepared following the procedure of Example 80, except substituting cyclobutane carboxylic acid hydroxysuccinimido ester for cyclopentane carboxylic acid hydroxysuccinimido ester.

EXAMPLE 151

Chc-Trp-Pro-Arg-Pro-Gln-Ile-Pro-Pro

The title compound is prepared following the procedure of Example 3, except substituting cyclohexane carboxylic acid hydroxysuccinimido ester for cyclopentane carboxylic acid hydroxysuccinimido ester.

EXAMPLE 152

Chc-Tyr-Pro-Arg-Pro-Gln-Ile-Pro-Pro

The title compound is prepared following the procedure of Example 6, except substituting cyclohexane carboxylic acid hydroxysuccinimido ester for cyclopentane carboxylic acid hydroxysuccinimido ester.

EXAMPLE 153

Bzl
|
Chc-Tyr-Pro-Arg-Pro-Gln-Ile-Pro-Pro

The title compound is prepared following the procedure of Example 5, except substituting cyclohexane carboxylic acid hydroxysuccinimido ester for cyclopentane carboxylic acid hydroxysuccinimido ester.

EXAMPLE 154

Chc-Phe-Pro-Arg-Pro-Gln-Ile-Pro-Pro

The title compound is prepared following the procedure of Example 2, except substituting cyclohexane carboxylic acid hydroxysuccinimido ester for cyclopentane carboxylic acid hydroxysuccinimido ester.

EXAMPLE 155

Chc-Gly-Pro-Arg-Pro-Gln-Ile-Pro-Pro

The title compound is prepared following the procedure of Example 76, except substituting cyclohexane carboxylic acid hydroxysuccinimido ester for cyclopentane carboxylic acid hydroxysuccinimido ester.

EXAMPLE 156

Chc-Leu-Pro-Arg-Pro-Gln-Ile-Pro-Pro

The title compound is prepared following the procedure of Example 78, except substituting cyclohexane carboxylic acid hydroxysuccinimido ester for cyclopentane carboxylic acid hydroxysuccinimido ester.

EXAMPLE 157

Chc-D-Trp-Pro-Arg-Pro-Gln-Ile-Pro-Pro

The title compound is prepared following the procedure of Example 80, except substituting cyclohexane carboxylic acid hydroxysuccinimido ester for cyclopentane carboxylic acid hydroxysuccinimido ester.

EXAMPLE 158

Cbc-Trp-pro-Gly-Pro-Lys-$\beta$Hphe-Ala-Pro

The title compound is prepared following the procedure described in Example 54, except utilizing cyclobutane carboxylic acid hydroxysuccinimido ester in place of Cpc.

EXAMPLE 159

Chc-Trp-Pro-Gly-Pro-Lys-$\beta$Hphe-Ala-Pro

The title compound is prepared following the procedure described in Example 54, except utilizing cyclohexane carboxylic acid hydroxysuccinimido ester in place of Cpc.

EXAMPLE 160

Chc-Trp-Pro-Gly-Pro-Nle-$\beta$Hphe-Ala-Pro

The title compound is prepared following the procedure described in Example 158 except utilizing tert.-butyloxycarbonyl norleucine and dicyclohexylcarbodiimide in place of $N^\alpha$-tert.-butyloxycarbonyl-$N^\epsilon$-benzyloxycarbonyl-lysine-$p$-nitrophenyl ester.

EXAMPLE 161

Cpc-Trp-Pro-Gly-Pro-Nle-$\beta$Hphe-Ala-Pro

The title compound is prepared following the procedure described in Example 54 except utilizing tert.-butyloxycarbonyl norleucine and dicyclohexylcarbodiimide in place of $N^\alpha$-tert.-butyloxycarbonyl-$N^\epsilon$-benzyloxycarbonyl-lysine-$p$-nitrophenyl ester.

EXAMPLE 162

Chc-Trp-Pro-Gly-Pro-Nle-$\beta$Hphe-Ala-Pro

The title compound is prepared following the procedure described in Example 159 except utilizing tert.-butyloxycarbonyl norleucine and dicyclohexylcarbodiimide in place of $N^\alpha$-tert.-butyloxycarbonyl-$N^\epsilon$-benzyloxycarbonyl-lysine-$p$-nitrophenyl ester.

EXAMPLE 163

Pyr-Trp-Pro-Arg-Pro-Glu-Phe-Pro-Pro

The title compound is prepared following the procedure described in Example 61, but substituting $\gamma$-benzyl tert.-butyloxycarbonyl glutamic acid in place of tert.-butyloxycarbonyl glutamine.

EXAMPLE 164

For determination of $I_{50}$ values (concentration of peptide expressed in micrograms/ml. producing a 50% inhition of angiotensin-converting enzyme), varying concentrations of peptide are added to 13×100 mm. assay tubes containing a final volume of 0.25 ml. containing 100 mM. potassium phosphate buffer, pH 7.5, 30 mM. NaCl, and 0.3 mM. angiotensin I. Enzymatic reactions are initiated by addiiton of enzyme and incubation is carried out at 37°. The concentration of representative peptides of the present invention which inhibit conversion of 50% of angiotensin I into angiotensin II is shown in the following table:

| Peptide of Example | $I_{50}$ ($\mu$g./ml.) |
|---|---|
| 2 | 0.65 |
| 3 | 0.22 |
| 10 | 0.045 |
| 11 | 0.17 |
| 12 | 0.36 |
| 14 | 1.6 |
| 15 | 1.1 |
| 16 | 2.4 |
| 17 | 0.14 |
| 18 | 3.3 |
| 19 | 0.06 |
| 25 | 0.36 |
| 26 | 9.0 |
| 27 | 0.06 |
| 28 | 0.06 |
| 29 | 0.05 |
| 34 | 0.05 |
| 53 | 0.25 |
| 57 | 5.0 |
| 58 | 4.8 |
| 61 | 0.27 |
| 62 | 2.5 |
| 63 | 0.06 |
| 81 | 1.0 |
| 120 | 1.9 |

EXAMPLE 165

Representative peptides of the present invention are administered intravenously to anesthetized male rats of the Sprague-Dawley strain weighing from 250 to 450 g. followed by an injection of 0.10 $\mu$g./kg. of angiotensin I. The following table indicates the peptide administered as well as the degree of inhibition relative to administration of angiotensin I above.

| Peptide of example | Dose (mg./kg.) | Number animals | Maximum inhibition of angiotensin I induced pressor response (percent plus standard error) |
|---|---|---|---|
| 42 | 0.5 | 4 | 53.2±4.5 |
| 42 | 2.0 | 4 | 82.2±6.1 |
| 42 | 8.0 | 3 | 87.5±8.2 |
| 44 | 2.0 | 4 | 41.5±9.8 |
| 44 | 8.0 | 4 | 73.3±10.6 |
| 91 | 0.5 | 4 | 60.5±3.6 |
| 91 | 2.0 | 4 | 79.8±8.8 |
| 92 | 8.0 | 4 | 41.9±10.5 |
| 92 | 32.0 | 4 | 78.3±3.0 |
| 95 | 0.5 | 3 | 55.7±13.3 |
| 95 | 2.0 | 4 | 87.4±3.6 |
| 95 | 8.0 | 4 | 89.1±4.7 |
| 81 | 0.5 | 4 | 80.0±3.5 |
| 81 | 2.0 | 4 | 87.7±2.4 |

What is claimed is:

1. A peptide having one of the following formulas:
(1) An acylated tripeptide of the formula Cac-Phe-Ala-Pro wherein Cac is chloroacetic acid;
(2) A tetrapeptide of the formula pGlu-Trp-Ala-Pro or pGlu-Lys-Trp-Ala;

(3) An acylated tetrapeptide of the formula

Dac-Gly-Phe-Ala-Pro or A-Lys-Phe-Ala-Pro wherein Dac is diazoacetic acid and A is chloroacetic acid, cyclobutylcarboxylic acid, cyclopentylcarboxylic acid or cyclohexylcarboxylic acid;
(4) A pentapeptide of the formula pGlu-B-Phe-Ala-Pro wherein B is Lys, Nle, Glu or Gln;

pGlu-C-Trp-Ala-Pro wherein C is Nle, His, Orn or Arg;

$N^\epsilon$ pGlu-Lys-Trp-Ala-Pro; pGlu-Lys-E-Ala-Pro wherein E is His, Ile, Pro, Ser or 3-amino-4-phenylbutyric acid;

pGlu-Lys-Phe-F-Pro wherein F is Gly, Pro or Lac;

pGlu-Lys-Phe-Ala-G wherein G is Ala, Asp or Glu;

pGlu-Lys-Trp-H wherein H is Ile-Pro, Thr-Pro, Ala-Gly or Ala-Sar;

pGlu-Trp-Pro-J-Pro wherein J is His, Lys or Gly;
(5) an acylated pentapeptide of the formula Dac-Gly-Gly-Phe-Ala-Pro wherein Dac is diazoacetic acid;
(6) A hexapeptide of the formula pGlu-Lys-Phe-Ala-Pro-Pro; pGlu-K-Trp-Pro-Arg-Pro wherein K is Asn, Nle or Ser;

pGlu-Nle-Trp-Pro-L-Pro wherein L is His or Gly;

pGlu-Asn-Trp-Pro-M-Pro wherein M is Lys or Gly;
(7) An octapeptide of the formula pGlu-Ile-Pro-Pro-Lys-Phe-Ala-Pro (8) An acylated octapeptide of the formula N-O-Pro-Arg-Pro-Gln-Ile-Pro-Pro wherein N is cyclobutylcarboxylic acid, cyclopentylcarboxylic acid or cyclohexylcarboxylic acid and O is Trp, Tyr, 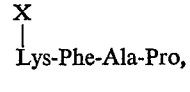 Phe, Gly, Leu, or D-Trp;

N-Trp-Pro-Gly-Pro-Lys-βHphe-Ala-Pro wherein N is as defined above and βHphe is 3-amino-4-phenylbutyric acid;
(9) A nonapeptide of the formula pGlu-Trp-Pro-P-Pro-Q-Ile-Pro-Pro wherein P is Arg, His, Lys or Gly and Q is Gln or Asn;

pGlu-Trp-Pro-R-Pro-S-T-Ala-Pro wherein R is Arg or Orn, S is Nle or Gln and T is Ile or Phe;

pGlu-Trp-Pro-Orn-Pro-S-T-Pro-Pro wherein S and T are as defined above;

pGlu-O-Pro-Arg-Pro-Gln-Ile-Pro-Pro wherein O is as defined above;

pGlu-Trp-Pro-Arg-Pro-Nle-T-Pro-Pro wherein T is as defined above;

pGlu-Trp-Pro-Arg-Pro-Glu-Phe-Pro-Pro
pGlu-Trp-Pro-Arg-Pro-Lys-Phe-Ala-Pro;
pGlu-Trp-Pro-D-Arg-Pro-Gln-Ile-Pro-Pro;
pGlu-Trp-Pro-Arg-Pro-Gln-Phe-Pro-Pro;
pGlu-Trp-Pro-Gly-Pro-Glu-Ile-Pro-Pro;
pGlu-Lys-Phe-Ala-Pro-Gln-Ile-Pro-Pro;

(10) A decapeptide of the formula pGlu-K-Trp-Pro-P-Pro-Q-Ile-Pro-Pro wherein K, P and Q are as defined above;

pGlu-U-Trp-Pro-Arg-Pro-Gln-Ile-Pro-Pro wherein U is Lys or Glu;

(11) An undecapeptide of the formula pGlu-Trp-Pro-Arg-Pro-V-Pro-W-Ile-Pro-Pro wherein V is Thr or Gly and W is Gln or Glu; or

(12) A tridecapeptide of the formula p-Glu-Gly-Gly-Trp-Pro-Arg-Pro-Gly-Pro-W-Ile-Pro-Pro wherein W is as defined above wherein unless otherwise indicated each optically active amino acid has the L-configuration.

2. A peptide having one of the following formulas:
X-Gly-Phe-Ala-Pro, Gly-Phe-Ala-Pro·Tfa, X
|
Lys-Phe-Ala-Pro, Y
|
X-Lys-Phe-Ala-Pro, $N^\alpha$-X-Lys-Trp-Ala-Pro, W-Ile-Pro-Pro;

NO₂
|
Pro-Q-Ile-Pro-Pro, pGlu-Trp-Pro-Arg-Pro;
P-Pro-Q-Ile-Pro-Pro, Thr-Pro-Gln-Ile-Pro-Pro, pGlu-Asn-Trp-Pro-His-Pro,

Tfa
|
pGlu-Ser-Trp-Pro-L-Pro, pGlu-Nle-Trp-Pro-Lys-Pro,

pGlu-Ser-Trp-Pro-Arg-Pro,

Gly-Pro-Glu-Ile-Pro-Pro,
  Pro-V-Pro-Gln-Ile-Pro-Pro,

NO₂
           |
    pGlu-Trp-Pro-Arg-Pro-Gly-Pro;

NO₂   Bzl
      |     |
pGlu-Trp-Pro-Arg-Pro-Thr-Pro;
  Arg-Pro-V-Pro-Gln-Ile-Pro-Pro,

Trp-Pro-Gly-Pro-Gln-Ile-Pro-Pro;
  Pro-Arg-Pro-V-Pro-Gln-Ile-Pro-Pro;
or
  Trp-Pro-Arg-Pro-V-Pro-Gln-Ile-Pro-Pro, wherein L is His or Gly, P is Arg, His, Lys or Gly, Q is Gln or Asn, V is Thr or Gly and W is Gln or Glu, and X and Y are amino protecting groups, provided X and Y are different when both are present in the same peptide wherein each optically active amino acid has the L-configuration.

3. A peptide having one of the following formulas:

Tfa
            |
    pGlu-Nle-Trp-Pro-Lys-Pro,

NO₂
           |
    pGlu-Ser-Trp-Pro-Arg-Pro,

Arg-Pro-Q-Ile-Pro-Pro,

Lys-Pro-Asn-Ile-Pro-Pro,

Gly-Pro-Q-Ile-Pro-Pro;

Pro-Gly-Pro-Gln-Ile-Pro-Pro;

Arg-Pro-Thr-Pro-Gln-Ile-Pro-Pro,

Trp-Pro-Gly-Pro-Gln-Ile-Pro-Pro,

Arg-Pro-Gly-Pro-Gln-Ile-Pro-Pro;

Pro-Arg-Pro-Thr-Pro-Gln-Ile-Pro-Pro,

Pro-Arg-Pro-Gly-Pro-Gln-Ile-Pro-Pro;
or
    Trp-Pro-Arg-Pro-V-Pro-Gln-Ile-Pro-Pro,
  wherein Q is Gln or Asn and V is Thr or Gly.

4. An intermediate for the nonapeptide of the formula Pyr-Trp-Pro-Arg-Pro-Gln-Ile-Pro-Pro having one of the following formulas:

Z-Ile-Pro-Pro-OBuᵗ

Z-Gln-Ile-Pro-Pro-OBuᵗ

Z-Pro-Gln-Ile-Pro-Pro-OBuᵗ

NO₂
           |
    Z-Arg-Pro-Gln-Ile-Pro-Pro-OBuᵗ

Arg-Pro-Gln-Ile-Pro-Pro·2HCl pGlu-Trp-Pro-Arg-Pro or

NO₂
           |
    pGlu-Trp-Pro-Arg-Pro.

5. A compound of claim 1 having the name
    Cpc-Trp-Pro-Arg-Pro-Gln-Ile-Pro-Pro
wherein Cpc is cyclopentylcarboxylic acid.

6. A compound of claim 1 having the name
    Cpc-Phe-Pro-Arg-Pro-Gln-Ile-Pro-Pro
wherein Cpc is cyclopentylcarboxylic acid.

7. A compound of claim 1 having the name
    pGlu-Trp-Pro-Arg-Pro-Gln-Ile-Pro-Pro.

8. A compound of claim 1 having the name
    pGlu-Trp-Pro-Lys-Pro-Gln-Ile-Pro-Pro.

9. A compound of claim 1 having the name
    pGlu-Trp-Pro-Gly-Pro-Gln-Ile-Pro-Pro.

10. A compound of claim 1 having the name
    pGlu-Trp-Pro-Arg-Pro-Gln-Phe-Pro-Pro.

11. A compound of claim 1 having the name
    pGlu-Trp-Pro-Orn-Pro-Gln-Ile-Pro-Pro.

12. A compound of claim 1 having the name
    pGlu-Phe-Pro-Arg-Pro-Gln-Ile-Pro-Pro.

13. A compound of claim 1 having the name

Bzl
            |
    pGlu-Tyr-Pro-Arg-Pro-Gln-Ile-Pro-Pro.

References Cited

Lande, J. Org. Chem., 27, 4558–62 (1962).
Wunsch, Hoppe-Seyler's Z. Phys. Chem., 322, 288–94 (1963).

LEWIS GOTTS, Primary Examiner

R. J. SUYAT, Assistant Examiner

U.S. Cl. X.R.
424—177